US009129461B2

(12) United States Patent
Luke et al.

(10) Patent No.: US 9,129,461 B2
(45) Date of Patent: Sep. 8, 2015

(54) APPARATUS, METHOD AND ARTICLE FOR COLLECTION, CHARGING AND DISTRIBUTING POWER STORAGE DEVICES, SUCH AS BATTERIES

(75) Inventors: Hok-Sum Horace Luke, Mercer Island, WA (US); Matthew Whiting Taylor, North Bend, WA (US); Huang-Cheng Hung, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 457 days.

(21) Appl. No.: 13/559,314

(22) Filed: Jul. 26, 2012

(65) Prior Publication Data
US 2013/0026971 A1  Jan. 31, 2013

Related U.S. Application Data

(60) Provisional application No. 61/511,900, filed on Jul. 26, 2011, provisional application No. 61/647,936, filed on May 16, 2012, provisional application No. 61/534,753, filed on Sep. 14, 2011, provisional (Continued)

(51) Int. Cl.
*H02J 7/00* (2006.01)
*G07C 5/08* (2006.01)
(Continued)

(52) U.S. Cl.
CPC ............ *G07C 5/0858* (2013.01); *B60L 3/003* (2013.01); *B60L 3/0069* (2013.01); *B60L 11/005* (2013.01); *B60L 11/1822* (2013.01); *B60L 11/1824* (2013.01); *B60L 11/1838* (2013.01); *B60L 11/1846* (2013.01); *B60L 11/1861* (2013.01); *E05B 81/56* (2013.01);

(Continued)

(58) Field of Classification Search
USPC .................................. 320/100–107
See application file for complete search history.

(56) References Cited

U.S. PATENT DOCUMENTS 1,387,848 A   8/1921   Good
3,470,974 A  10/1969   Pefine
(Continued)

FOREIGN PATENT DOCUMENTS

CA   2 865 975 A1   9/2013
DE   44 32 539 A1   6/1995
(Continued)

OTHER PUBLICATIONS

Chen et al., "Apparatus, System, and Method for Authentication of Vehicular Components," U.S. Appl. No. 13/918,703, filed Jun. 14, 2013, 84 pages.

(Continued)

*Primary Examiner* — Binh Tat
(74) *Attorney, Agent, or Firm* — Seed IP Law Group PLLC

(57) ABSTRACT

A collection, charging and distribution machine collects, charges and distributes portable electrical energy storage devices (e.g., batteries, super- or ultracapacitors). To charge, the machine employs electrical current from an external source, such as the electrical grid or an electrical service of an installation location. The machine determines a first number of devices to be rapidly charged, employing charge from a second number of devices identified to sacrifice charge. Thus, some devices may be concurrently charged via current from the electrical service and current from other devices, to achieve rapid charging of some subset of devices. The devices that sacrifice charge may later be charged. Such may ensure availability of devices for end users.

53 Claims, 10 Drawing Sheets

Related U.S. Application Data application No. 61/534,761, filed on Sep. 14, 2011, provisional application No. 61/534,772, filed on Sep. 14, 2011, provisional application No. 61/511,887, filed on Jul. 26, 2011, provisional application No. 61/647,941, filed on May 16, 2012, provisional application No. 61/511,880, filed on Jul. 26, 2011, provisional application No. 61/557,170, filed on Nov. 8, 2011, provisional application No. 61/581,566, filed on Dec. 29, 2011, provisional application No. 61/601,404, filed on Feb. 21, 2012, provisional application No. 61/601,949, filed on Feb. 22, 2012, provisional application No. 61/601,953, filed on Feb. 22, 2012.

(51) Int. Cl.

| | |
|---|---|
| *G07C 5/00* | (2006.01) |
| *H01M 10/42* | (2006.01) |
| *G01C 21/34* | (2006.01) |
| *G06Q 30/02* | (2012.01) |
| *G06Q 30/06* | (2012.01) |
| *H02J 4/00* | (2006.01) |
| *E05B 81/56* | (2014.01) |
| *B60L 3/00* | (2006.01) |
| *B60L 11/00* | (2006.01) |
| *B60L 11/18* | (2006.01) |
| *G06Q 10/02* | (2012.01) |
| *H01M 10/44* | (2006.01) |
| *H01M 10/48* | (2006.01) |

(52) U.S. Cl.
CPC ........... *G01C 21/3476* (2013.01); *G06Q 10/02* (2013.01); *G06Q 30/0253* (2013.01); *G06Q 30/0259* (2013.01); *G06Q 30/0267* (2013.01); *G06Q 30/0639* (2013.01); *G07C 5/00* (2013.01); *H01M 10/425* (2013.01); *H01M 10/4257* (2013.01); *H01M 10/441* (2013.01); *H01M 10/482* (2013.01); *H02J 4/00* (2013.01); *H02J 7/00* (2013.01); *H02J 7/007* (2013.01); *H02J 7/0013* (2013.01); *B60L 2200/12* (2013.01); *B60L 2210/12* (2013.01); *B60L 2210/14* (2013.01); *B60L 2210/30* (2013.01); *B60L 2230/16* (2013.01); *B60L 2230/40* (2013.01); *B60L 2240/70* (2013.01); *H01M 2010/4278* (2013.01); *H01M 2220/20* (2013.01); *H01M 2220/30* (2013.01); *H02J 2007/0001* (2013.01); *H02J 2007/0098* (2013.01); *Y02E 60/12* (2013.01); *Y02T 10/7005* (2013.01); *Y02T 10/705* (2013.01); *Y02T 10/7011* (2013.01); *Y02T 10/7022* (2013.01); *Y02T 10/7044* (2013.01); *Y02T 10/7055* (2013.01); *Y02T 10/7072* (2013.01); *Y02T 10/7094* (2013.01); *Y02T 10/7225* (2013.01); *Y02T 10/7233* (2013.01); *Y02T 10/7241* (2013.01); *Y02T 10/7258* (2013.01); *Y02T 10/7291* (2013.01); *Y02T 10/92* (2013.01); *Y02T 90/121* (2013.01); *Y02T 90/124* (2013.01); *Y02T 90/127* (2013.01); *Y02T 90/128* (2013.01); *Y02T 90/14* (2013.01); *Y02T 90/16* (2013.01); *Y02T 90/161* (2013.01); *Y02T 90/163* (2013.01); *Y02T 90/168* (2013.01); *Y02T 90/169* (2013.01); *Y04S 30/12* (2013.01); *Y04S 30/14* (2013.01); *Y10T 70/7062* (2015.04); *Y10T 307/406* (2015.04)

(56) References Cited

U.S. PATENT DOCUMENTS

| | | |
|---|---|---|
| 3,664,450 A | 5/1972 | Udden et al. |
| 3,678,455 A | 7/1972 | Levey |
| 4,087,895 A | 5/1978 | Etienne |
| 4,129,759 A | 12/1978 | Hug |
| 4,216,839 A | 8/1980 | Gould et al. |
| 4,669,570 A | 6/1987 | Perret |
| 5,187,423 A | 2/1993 | Marton |
| 5,189,325 A | 2/1993 | Jarczynski |
| 5,236,069 A | 8/1993 | Peng |
| 5,339,250 A | 8/1994 | Durbin |
| 5,349,535 A | 9/1994 | Gupta |
| 5,376,869 A | 12/1994 | Konrad |
| 5,544,784 A | 8/1996 | Malaspina |
| 5,596,261 A | 1/1997 | Suyama |
| 5,627,752 A | 5/1997 | Buck et al. |
| 5,631,536 A | 5/1997 | Tseng |
| 5,642,270 A | 6/1997 | Green et al. |
| 5,815,824 A | 9/1998 | Saga et al. |
| 5,839,800 A | 11/1998 | Koga et al. |
| 5,898,282 A | 4/1999 | Drozdz et al. |
| 5,998,963 A | 12/1999 | Aarseth |
| 6,016,882 A | 1/2000 | Ishikawa |
| 6,154,006 A | 11/2000 | Hatanaka et al. |
| 6,177,867 B1 | 1/2001 | Simon et al. |
| 6,177,879 B1 | 1/2001 | Kokubu et al. |
| 6,236,333 B1 | 5/2001 | King |
| 6,403,251 B1 | 6/2002 | Baggaley et al. |
| 6,429,622 B1 | 8/2002 | Svensson |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,917,306 B2 | 7/2005 | Lilja |
| 6,952,795 B2 | 10/2005 | O'Gorman et al. |
| 7,010,682 B2 | 3/2006 | Reinold et al. |
| 7,131,005 B2 | 10/2006 | Levenson et al. |
| 7,392,068 B2 | 6/2008 | Dayan et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,596,709 B2 | 9/2009 | Cooper et al. |
| 7,617,893 B2 | 11/2009 | Syed et al. |
| 7,698,044 B2 | 4/2010 | Prakash et al. |
| 7,728,548 B2 | 6/2010 | Daynes et al. |
| 7,761,307 B2 | 7/2010 | Ochi et al. |
| 7,778,746 B2 | 8/2010 | McLeod et al. |
| 7,863,858 B2 | 1/2011 | Gangstoe et al. |
| 7,868,591 B2 | 1/2011 | Phillips et al. |
| 7,898,439 B2 | 3/2011 | Bettez et al. |
| 7,908,020 B2 | 3/2011 | Pieronek |
| 7,923,144 B2 | 4/2011 | Kohn et al. |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 | 11/2011 | Valentine et al. |
| 8,106,631 B2 | 1/2012 | Abe |
| 8,118,132 B2 | 2/2012 | Gray, Jr. |
| 8,164,300 B2 | 4/2012 | Agassi et al. |
| 8,219,839 B2 | 7/2012 | Akimoto |
| 8,229,625 B2 | 7/2012 | Lal et al. |
| 8,265,816 B1 | 9/2012 | LaFrance |
| 8,301,365 B2 | 10/2012 | Niwa et al. |
| 8,319,605 B2 | 11/2012 | Hassan et al. |

(56) References Cited

U.S. PATENT DOCUMENTS

| | | |
|---|---|---|
| 8,326,259 B2 | 12/2012 | Gautama et al. |
| 8,354,768 B2 | 1/2013 | Cipriani |
| 8,355,965 B2 | 1/2013 | Yamada |
| 8,378,627 B2 | 2/2013 | Asada et al. |
| 8,412,401 B2 | 4/2013 | Bertosa et al. |
| 8,437,908 B2 | 5/2013 | Goff et al. |
| 8,447,598 B2 | 5/2013 | Chutorash et al. |
| 8,614,565 B2 | 12/2013 | Lubawy |
| 8,725,135 B2 | 5/2014 | Weyl et al. |
| 2001/0018903 A1 | 9/2001 | Hirose et al. |
| 2002/0023789 A1 | 2/2002 | Morisawa et al. |
| 2002/0070851 A1 | 6/2002 | Raichle et al. |
| 2003/0052796 A1 | 3/2003 | Schmidt et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0236615 A1 | 11/2004 | Msndy |
| 2004/0246119 A1 | 12/2004 | Martin et al. |
| 2006/0047380 A1 | 3/2006 | Welch |
| 2006/0208850 A1 | 9/2006 | Ikeuchi et al. |
| 2006/0284601 A1 | 12/2006 | Salasoo et al. |
| 2007/0026996 A1 | 2/2007 | Ayabe et al. |
| 2007/0035397 A1 | 2/2007 | Patenaude et al. |
| 2007/0069687 A1 | 3/2007 | Suzuki |
| 2007/0090921 A1 | 4/2007 | Fisher |
| 2007/0145945 A1 | 6/2007 | McGinley et al. |
| 2007/0159297 A1 | 7/2007 | Paulk et al. |
| 2007/0208468 A1 | 9/2007 | Sankaran et al. |
| 2008/0084177 A1* | 4/2008 | Sander et al. ............... 320/101 |
| 2008/0276110 A1 | 11/2008 | Indiani et al. |
| 2009/0024872 A1 | 1/2009 | Beverly |
| 2009/0033456 A1 | 2/2009 | Castillo et al. |
| 2009/0082957 A1 | 3/2009 | Agassi et al. |
| 2009/0112394 A1 | 4/2009 | Lepejian et al. |
| 2009/0158790 A1 | 6/2009 | Oliver |
| 2009/0198372 A1 | 8/2009 | Hammerslag |
| 2009/0240575 A1 | 9/2009 | Bettez et al. |
| 2009/0251300 A1 | 10/2009 | Yasuda et al. |
| 2009/0294188 A1 | 12/2009 | Cole |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0089547 A1 | 4/2010 | King et al. |
| 2010/0094496 A1 | 4/2010 | Hershkovitz et al. |
| 2010/0114798 A1 | 5/2010 | Sirton |
| 2010/0114800 A1 | 5/2010 | Yasuda et al. |
| 2010/0145717 A1 | 6/2010 | Hoeltzel |
| 2010/0161481 A1 | 6/2010 | Littrell |
| 2010/0188043 A1 | 7/2010 | Kelty et al. |
| 2010/0198535 A1 | 8/2010 | Brown et al. |
| 2010/0198754 A1 | 8/2010 | Jones et al. |
| 2010/0201482 A1 | 8/2010 | Robertson et al. |
| 2010/0235043 A1 | 9/2010 | Seta et al. |
| 2010/0308989 A1 | 12/2010 | Gasper |
| 2011/0016063 A1* | 1/2011 | Pollack et al. ............... 705/412 |
| 2011/0025263 A1* | 2/2011 | Gilbert ............... 320/108 |
| 2011/0025267 A1 | 2/2011 | Kamen et al. |
| 2011/0029157 A1 | 2/2011 | Muzaffer |
| 2011/0031929 A1 | 2/2011 | Asada et al. |
| 2011/0032110 A1 | 2/2011 | Taguchi |
| 2011/0071932 A1 | 3/2011 | Agassi et al. |
| 2011/0082621 A1 | 4/2011 | Berkobin et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0160992 A1 | 6/2011 | Crombez |
| 2011/0169447 A1 | 7/2011 | Brown et al. |
| 2011/0200193 A1 | 8/2011 | Blitz et al. |
| 2011/0202476 A1 | 8/2011 | Nagy et al. |
| 2011/0218703 A1 | 9/2011 | Uchida |
| 2011/0224868 A1 | 9/2011 | Collings, III et al. |
| 2011/0224900 A1 | 9/2011 | Hiruta et al. |
| 2011/0241824 A1 | 10/2011 | Uesugi |
| 2011/0260691 A1 | 10/2011 | Ishibashi et al. |
| 2011/0270480 A1 | 11/2011 | Ishibashi et al. |
| 2011/0279257 A1 | 11/2011 | Au et al. |
| 2011/0292667 A1 | 12/2011 | Meyers |
| 2011/0295454 A1 | 12/2011 | Meyers |
| 2011/0303509 A1 | 12/2011 | Agassi et al. |
| 2012/0000720 A1 | 1/2012 | Honda et al. |
| 2012/0013182 A1 | 1/2012 | Minegishi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0143410 A1 | 6/2012 | Gallagher et al. |
| 2012/0157083 A1 | 6/2012 | Otterson |
| 2012/0158229 A1 | 6/2012 | Schaefer |
| 2012/0167071 A1 | 6/2012 | Paek |
| 2012/0194346 A1 | 8/2012 | Tsai et al. |
| 2012/0223575 A1 | 9/2012 | Hachiya et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0280573 A1 | 11/2012 | Ohkura et al. |
| 2012/0296512 A1 | 11/2012 | Lee et al. |
| 2012/0299537 A1 | 11/2012 | Kikuchi |
| 2012/0299721 A1 | 11/2012 | Jones |
| 2012/0316671 A1 | 12/2012 | Hammerslag et al. |
| 2013/0024306 A1 | 1/2013 | Shah et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0254097 A1 | 9/2013 | Marathe et al. |
| 2013/0282254 A1 | 10/2013 | Dwan et al. |
| 2014/0163813 A1 | 6/2014 | Chen et al. |
| 2014/0279576 A1 | 9/2014 | Luke |
| 2014/0368032 A1 | 12/2014 | Doerndorfer |
| 2015/0042157 A1 | 2/2015 | Chen et al. |

FOREIGN PATENT DOCUMENTS

| | | |
|---|---|---|
| EP | 0 693 813 A1 | 1/1996 |
| EP | 1 177 955 A2 | 2/2002 |
| EP | 1 667 306 A1 | 6/2006 |
| EP | 2 101 390 A2 | 9/2009 |
| EP | 2 230 146 A2 | 9/2010 |
| EP | 2 428 939 A1 | 3/2012 |
| JP | 5-135804 A1 | 6/1993 |
| JP | 07-031008 A | 1/1995 |
| JP | 7-36504 U | 7/1995 |
| JP | 9-119839 A | 5/1997 |

(56) References Cited

FOREIGN PATENT DOCUMENTS

| | | |
|---|---|---|
| JP | 10-170293 A | 6/1998 |
| JP | 10-307952 A | 11/1998 |
| JP | 11-049079 | 2/1999 |
| JP | 11-51681 A | 2/1999 |
| JP | 11-176487 A | 7/1999 |
| JP | 11-205914 A | 7/1999 |
| JP | 2000-102102 A | 4/2000 |
| JP | 2000-102103 A | 4/2000 |
| JP | 2000-341868 A | 12/2000 |
| JP | 2001-128301 | 5/2001 |
| JP | 2003-118397 | 4/2003 |
| JP | 2003-262525 A | 9/2003 |
| JP | 2005-67453 A | 3/2005 |
| JP | 2006-121874 A | 5/2006 |
| JP | 2007-35479 A | 2/2007 |
| JP | 2007-60353 A | 3/2007 |
| JP | 2008-127894 A | 6/2008 |
| JP | 2008-219953 A | 9/2008 |
| JP | 2008-285075 A | 11/2008 |
| JP | 2009-512035 A | 3/2009 |
| JP | 2009-171646 A | 7/2009 |
| JP | 2009-171647 A | 7/2009 |
| JP | 4319289 B2 | 8/2009 |
| JP | 2010-022148 A | 1/2010 |
| JP | 2010-108833 A | 5/2010 |
| JP | 2010-148246 A | 7/2010 |
| JP | 2010-191636 A | 9/2010 |
| JP | 2010-200405 A | 9/2010 |
| JP | 2010-269686 A | 12/2010 |
| JP | 2010-540907 A | 12/2010 |
| JP | 2011-126452 | 6/2011 |
| JP | 2011-131631 A | 7/2011 |
| JP | 2011-131805 A | 7/2011 |
| JP | 2011-142704 A | 7/2011 |
| JP | 2011-233470 A | 11/2011 |
| JP | 2012-151916 A | 8/2012 |
| JP | 2012-526409 A | 10/2012 |
| KR | 1998-045020 U | 9/1998 |
| KR | 2004-0005146 A | 1/2004 |
| KR | 20100012401 A | 2/2010 |
| KR | 10-0971278 B1 | 7/2010 |
| KR | 20110004292 A | 1/2011 |
| KR | 20110041783 A | 4/2011 |
| KR | 20120020554 A | 3/2012 |
| TW | 200836452 A | 9/2008 |
| TW | I315116 B | 9/2009 |
| TW | M371880 U1 | 1/2010 |
| TW | M379269 U1 | 4/2010 |
| TW | M379789 U1 | 5/2010 |
| TW | M385047 U1 | 7/2010 |
| TW | 201043986 A1 | 12/2010 |
| TW | 201044266 A1 | 12/2010 |
| WO | 98/21132 A1 | 5/1998 |
| WO | 99/03186 A1 | 1/1999 |
| WO | 2009/039454 A1 | 3/2009 |
| WO | 2010/005052 A2 | 1/2010 |
| WO | 2010/033517 A2 | 3/2010 |
| WO | 2010/033881 A1 | 3/2010 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013/024483 A2 | 2/2013 |
| WO | 2013/024484 A1 | 2/2013 |
| WO | 2013/042216 A1 | 3/2013 |
| WO | 2013/074819 A1 | 5/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/128007 A2 | 9/2013 |
| WO | 2013/128009 A2 | 9/2013 |
| WO | 2013/128009 A3 | 9/2013 |
| WO | 2013/142154 A1 | 9/2013 |
| WO | 2013/144951 A1 | 10/2013 |

OTHER PUBLICATIONS

Chen et al., "Apparatus, System, and Method for Authentication of Vehicular Components ," U.S. Appl. No. 61/783,041, filed Mar. 14, 2013, 84 pages.

Chen et al., "Apparatus, System, and Method for Authentication of Vehicular Components," Office Action mailed Nov. 22, 2013, for U.S. Appl. No. 13/918,703, 35 pages.

Chen et al., "Apparatus, Method and Article for Providing Vehicle Diagnostic Data," U.S. Appl. No. 61/601,404, filed Feb. 21, 2012, 56 pages.

Chen et al., "Apparatus, Method and Article for Providing Vehicle Diagnostic Data," U.S. Appl. No. 14/022,134, filed Sep. 9, 2013, 61 pages.

Huang et al., "Apparatus, Method and Article for Vehicle Turn Signals," U.S. Appl. No. 61/727,403, filed Nov. 16, 2012, 41 pages.

Huang et al., "Apparatus, Method and Article for Vehicle Turn Signals," U.S. Appl. No. 14/079,894, filed Nov. 14, 2013, 41 pages.

International Search Report and Written Opinion for corresponding European Patent Application No. PCT/US2012/048349, mailed Feb. 18, 2013, 9 pages.

International Search Report and Written Opinion for corresponding European Patent Application No. PCT/US2012/048354, mailed Feb. 18, 2013, 11 pages.

International Search Report and Written Opinion for corresponding European Patent Application No. PCT/US2012/048358, mailed Feb. 25, 2013, 9 pages.

International Search Report and Written Opinion for corresponding European Patent Application No. PCT/US2012/048366, mailed Jan. 21, 2013, 10 pages.

International Search Report and Written Opinion for corresponding European Patent Application No. PCT/US2012/048367, mailed Jan. 17, 2013, 8 pages.

International Search Report and Written Opinion for corresponding European Patent Application No. PCT/US2012/048375, mailed Jan. 23, 2013, 9 pages.

International Search Report and Written Opinion for corresponding European Patent Application No. PCT/US2012/048379, mailed Dec. 17, 2012, 9 pages.

International Search Report and Written Opinion for corresponding International Application No. PCT/US2012/048391, mailed Dec. 21, 2012, 9 pages.

International Search Report and Written Opinion for corresponding International Patent Application No. PCT/US2012/048380, mailed Feb. 27, 2013, 9 pages.

International Search Report and Written Opinion for corresponding International Patent Application No. PCT/US2012/048382, mailed Feb. 27, 2013, 9 pages.

International Search Report and Written Opinion for corresponding European Patent Application No. PCT/US2012/063979, mailed Mar. 4, 2013, 10 pages.

International Search Report and Written Opinion for corresponding European Patent Application No. PCT/US2012/048347, mailed Dec. 18, 2012, 8 pages.

Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.

Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.

Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.

Luke et al., "Detectible Indication of an Electric Motor Vehicle Standby Mode," U.S. Appl. No. 61/543,720, filed Oct. 5, 2011, 35 pages.

(56) References Cited

OTHER PUBLICATIONS

Luke et al., "Detectible Indication of an Electric Motor Vehicle Standby Mode," U.S. Appl. No. 61/684,432, filed Aug. 17, 2012, 41 pages.
Luke et al., "Drive Assembly for Electric Powered Device," U.S. Appl. No. 61/546,411, filed Oct. 12, 2011, 18 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," U.S. Appl. No. 14/023,344, filed Sep. 10, 2013, 59 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Apparatus, Method and Article for Redistributing Power Storage Devices, Such as Batteries, Between Collection Charging and Distribution Machines," U.S. Appl. No. 13/559,091, filed Jul. 26, 2012, 69 pages.
Luke et al., "Detectible Indication of an Electric Motor Vehicle Standby Mode," U.S. Appl. No. 13/646,320, filed Oct. 5, 2012, 41 pages.
Luke et al., "Dynamically Limiting Vehicle Operation for Best Effort Economy," U.S. Appl. No. 61/511,880, filed Jul. 26, 2011, 52 pages.
Luke et al., "Dynamically Limiting Vehicle Operation for Best Effort Economy," Office Action for U.S. Appl. No. 13/559,264, mailed Aug. 14, 2013, 21 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Physical Security of Power Storage Devices in Vehicles," Notice of Allowance for U.S. Appl. No. 13/559,054, mailed May 30, 2013, 32 pages.
Taylor et al., "Apparatus, Method and Article for Physical Security of Power Storage Devices in Vehicles," Office Action for U.S. Appl. No. 13/559,054, mailed Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.
Wu et al., "Apparatus, Method and Article for Providing Locations of Power Storage Device Collection, Charging and Distribution Machines," Office Action mailed Nov. 27, 2013, for U.S. Appl. No. 13/559,333, 19 pages.
Wu et al., "Apparatus, Method and Article for Security of Vehicles," U.S. Appl. No. 61/557,176, filed Nov. 8, 2011, 37 pages.
Wu, "Battery Configuration for an Electric Vehicle," U.S. Appl. No. 14/057,405, filed Oct. 18, 2013, 38 pages.
Chen et al., "Apparatus, Method and Article for Providing Vehicle Diagnostic Data," Office Action mailed Dec. 30, 2013, for U.S. Appl. No. 14/022,134, 20 pages.
International Preliminary Report on Patentability and Written Opinion for corresponding International Patent Application No. PCT/US2012/048349, issued on Jan. 28, 2014, 5 pages.
International Preliminary Report on Patentability and Written Opinion for corresponding International Patent Application No. PCT/US2012/048354, issued on Jan. 28, 2014, 7 pages.
International Preliminary Report on Patentability and Written Opinion for corresponding International Patent Application No. PCT/US2012/048358, issued on Jan. 28, 2014, 5 pages.
International Preliminary Report on Patentability and Written Opinion for corresponding International Patent Application No. PCT/US2012/048366, issued on Jan. 28, 2014, 5 pages.
International Preliminary Report on Patentability and Written Opinion for corresponding International Patent Application No. PCT/US2012/048367, issued on Jan. 28, 2014, 4 pages.
International Preliminary Report on Patentability and Written Opinion for corresponding International Patent Application No. PCT/US2012/048375, issued on Jan. 28, 2014, 5 pages.
International Preliminary Report on Patentability and Written Opinion for corresponding International Patent Application No. PCT/US2012/048379, issued on Jan. 28, 2014, 5 pages.
International Preliminary Report on Patentability and Written Opinion for corresponding International Patent Application No. PCT/US2012/048380, issued on Jan. 28, 2014, 5 pages.
International Preliminary Report on Patentability and Written Opinion for corresponding International Patent Application No. PCT/US2012/048382, issued on Jan. 28, 2014, 5 pages.
International Preliminary Report on Patentability and Written Opinion for corresponding International Patent Application No. PCT/US2012/048391, issued on Jan. 28, 2014, 6 pages.
International Search Report and Written Opinion for corresponding International Application No. PCT/US2013/070131, mailed Feb. 19, 2014, 17 pages.
Luke et al., "Apparatus, Method and Article for Authentication, Security and Control of Portable Charging Devices and Power Storage Devices, Such as Batteries," Office Action mailed Jan. 6, 2014, for U.S. Appl. No. 14/017,090, 19 pages.

(56) References Cited

OTHER PUBLICATIONS

Luke et al., "Modular System for Collection and Distribution of Electric Storage Devices," U.S. Appl. No. 14/202,589, filed Mar. 10, 2014, 76 pages.
Luke et al., "Apparatus, Method and Article for Authentication, Security and Control of Power Storage Devices, Such as Batteries," Office Action mailed Feb. 26, 2014, for U.S. Appl. No. 13/559,038, 13 pages.
Luke et al., "Apparatus, Method and Article for Authentication, Security and Control of Power Storage Devices, Such as Batteries," Office Action mailed Feb. 25, 2014, for U.S. Appl. No. 14/023,344, 12 pages.
Luke et al., "Dynamically Limiting Vehicle Operation for Best Effort Economy," Office Action for U.S. Appl. No. 13/559,264, mailed Feb. 12, 2014, 24 pages.
Luke, "Apparatus, Method and Article for Providing Information Regarding a Vehicle Via a Mobile Device," Office Action for U.S. Appl. No. 14/017,081, mailed Jan. 30, 2014, 36 pages.
Wu et al., "Apparatus, Method and Article for a Power Storage Device Compartment," Office Action for U.S. Appl. No. 13/559,125, mailed Feb. 24, 2014, 28 pages.
Wu et al., "Apparatus, Method and Article for Providing Information Regarding Availability of Power Storage Devices at a Power Storage Device Collection, Charging and Distribution Machine," Office Action mailed Mar. 5, 2014, for U.S. Appl. No. 14/022,140, 8 pages.
Wu et al., "Apparatus, Method and Article for Providing Locations of Power Storage Device Collection, Charging and Distribution Machines," Office Action mailed Mar. 5, 2014, for U.S. Appl. No. 14/022,147, 12 pages.
"Inrunner," retreived from URL=http://en.wikipedia.org/w/index.php?title=Inrunner&printable=yes on Sep. 28, 2011, 1 page.
"Outrunner," retreived from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S Appl. No. 61/862,854, filed Aug. 6, 2013, 74 pages.
Chen et al., "Apparatus, System, and Method for Authentication of Vehicular Components," Notice of Allowance mailed Mar. 25, 2014, for U.S. Appl. No. 13/918,703, 7 pages.
Chen et al., "Apparatus, Method and Article for Providing Vehicle Diagnostic Data," Office Action mailed Apr. 9, 2014, for U.S. Appl. No. 14/022,134, 20 pages.
Chen et al., "Apparatus, Method and Article for Providing Vehicle Diagnostic Data," Notice of Allowance mailed Jul. 9, 2014, for U.S. Appl. No. 14/022,134, 10 pages.
Chen et al., "Apparatus, Method and Article for Providing Vehicle Diagnostic Data," Office Action mailed Jun. 18, 2014, for U.S. Appl. No. 13/559,390, 16 pages.
Chen et al., "Apparatus, Method and Article for Providing Vehicle Diagnostic Data," Notice of Allowance mailed Nov. 3, 2014, for U.S. Appl. No. 13/559,390, 10 pages.
Chen et al., "Apparatus, Method and Article for Providing Vehicle Diagnostic Data," U.S. Appl. No. 14/609,201, filed Jan. 29, 2015, 61 pages.
Chen et al., "Systems and Methods for Powering Electric Vehicles Using a Single or Multiple Power Cells," U.S. Appl. No. 61/862,852, filed Aug. 6, 2013, 46 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
International Search Report and Written Opinion for corresponding International Patent Application No. PCT/US2012/048344, mailed Feb. 28, 2013, 9 pages.
International Search Report and Written Opinion for corresponding International Application No. PCT/US2012/058930, mailed Mar. 15, 2013, 11 pages.
International Search Report and Written Opinion for corresponding International Application No. PCT/US2013/065704, mailed Feb. 13, 2014, 13 pages.
International Search Report and Written Opinion for corresponding International Application No. PCT/US2012/059931, mailed Mar. 29, 2013, 13 pages.
International Search Report and Written Opinion, for corresponding International Application No. PCT/US2014/021369, mailed Jul. 2, 2014, 14 pages.
International Search Report and Written Opinion for corresponding International Application No. PCT/US2014/024757, mailed Jul. 11, 2014, 15 pages.
International Search Report and Written Opinion, for corresponding International Application No. PCT/US2014/022610, mailed Jul. 10, 2014, 12 pages.
International Search Report and Written Opinion for corresponding International Application No. PCT/US2014/023539, mailed Sep. 4, 2014, 12 pages.
International Search Report and Written Opinion for corresponding International Application No. PCT/US2014/050001, mailed Nov. 18, 2014, 9 pages.
Japanese Office Action with English Translation, mailed Dec. 16, 2014, for corresponding JP Application No. 2014-523013, 11 pages.
English Translation of Japanese Office Action mailed Feb. 17, 2015, for corresponding Japanese Patent Application No. 2014-523007, 7 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power Storage Devices, Such As Batteries," Office Action mailed Jun. 26, 2014, for U.S. Appl. No. 14/017,090, 19 pages.
Luke et al., "Detectible Indication of an Electric Motor Vehicle Standby Mode," Office Action for U.S. Appl. No. 13/646,320, mailed May 30, 2013, 13 pages.
Luke et al., "Detectible Indication of an Electric Motor Vehicle Standby Mode," Notice of Allowance for U.S. Appl. No. 13/646,320, mailed Apr. 10, 2014, 8 pages.
Luke et al., "Electric Device Drive Assembly and Cooling System," U.S. Appl. No. 61/615,144, filed Mar. 23, 2012, 43 pages.
Luke et al., "Apparatus, Method and Article for Authentication, Security and Control of Power Storage Devices, Such as Batteries," Office Action mailed Aug. 19, 2014, for U.S. Appl. No. 13/559,038, 14 pages.
Luke et al., "Apparatus, Method and Article for Authentication, Security and Control of Power Storage Devices, Such as Batteries," Office Action mailed Aug. 21, 2014, for U.S. Appl. No. 14/023,344, 13 pages.
Luke et al., "Dynamically Limiting Vehicle Operation for Best Effort Economy," Office Action for U.S. Appl. No. 13/559,264, mailed Aug. 19, 2014, 26 pages.
Luke et al., "Dynamically Limiting Vehicle Operation for Best Effort Economy," Office Action for U.S. Appl. No. 13/559,264, mailed Jan. 21, 2015, 31 pages.
Luke et al., "Thermal Management of Components in Electric Motor Drive Vehicles," Office Action mailed Apr. 2, 2014, for U.S. Appl. No. 13/559,259, 11 pages.
Luke, "Apparatus, Method and Article for Providing Information Regarding a Vehicle Via a Mobile Device," Office Action for U.S. Appl. No. 14/017,081, mailed Jul. 21, 2014, 42 pages.

(56) References Cited

OTHER PUBLICATIONS

Luke, "Apparatus, Method and Article for Providing Information Regarding a Vehicle Via a Mobile Device," Office Action for U.S. Appl. No. 14/017,081, mailed Dec. 31, 2014, 59 pages.

Microchip, "AN885: Brushless DC (BLDC) Motor Fundamentals," Microchip Technology Inc., 2003, 19 pages.

Taylor et al., "Apparatus, Method and Article for Physical Security of Power Storage Devices in Vehicles," Office Action mailed Dec. 10, 2014, for U.S. Appl. No. 14/012,845, 13 pages.

Wu et al., "Apparatus, Method and Article for Security of Vehicles," Office Action mailed Oct. 2, 2014, for U.S. Appl. No. 13/671,144, 20 pages.

Wu et al., "Apparatus, Method and Article for a Power Storage Device Compartment," Office Action for U.S. Appl. No. 13/559,125, mailed Sep. 9, 2014, 28 pages.

Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance mailed Jun. 30, 2014, for U.S. Appl. No. 14/022,140, 5 pages.

Wu et al., "Apparatus, Method and Article for Providing to a User Device Information Regarding Availability of Portable Electrical Energy Storage Devices at a Portable Electrical Storage Device Collection, Charging and Distribution Machine," U.S. Appl. No. 14/511,137, filed Oct. 9, 2014, 56 pages.

Wu et al., "Apparatus, Method and Article for Providing Locations of Power Storage Device Collection, Charging and Distribution Machines," Notice of Allowance mailed Jul. 10, 2014, for U.S. Appl. No. 13/559,333, 9 pages.

Wu et al., "Apparatus, Method and Article for Providing Locations of Power Storage Device Collection, Charging and Distribution Machines," Office Action mailed Aug. 6, 2014, for U.S. Appl. No. 14/022,147, 17 pages.

Wu et al., "Apparatus, Method and Article for Providing Locations of Power Storage Device Collection, Charging and Distribution Machines," Notice of Allowance mailed Nov. 25, 2014, for U.S. Appl. No. 14/022,147, 5 pages.

Wu et al., "Apparatus, Method and Article for Power Storage Device Failure Safety," U.S. Appl. No. 14/071,134, filed Nov. 4, 2013, 68 pages.

Wu et al., "Apparatus, Method and Article for Power Storage Device Failure Safety," Office Action for U.S. Appl. No. 14/071,134, mailed Feb. 12, 2014, 14 pages.

Wu et al., "Apparatus, Method and Article for Power Storage Device Failure Safely," Office Action mailed Jun. 9, 2014, for U.S. Appl. No. 14/071,134, 15 pages.

Chen et al., "Apparatus, Method and Article for Providing Vehicle Diagnostic Data," Office Action, dated Jun. 3, 2015, U.S. Appl. No. 14/179,442, 20 pages.

Extended European Search Report, dated Apr. 24, 2015, for European Application No. 12817097.4, 9 pages.

Huang et al., "Apparatus, Method and Article for Vehicle Turn Signals," Office Action, dated May 14, 2015, U.S. Appl. No. 14/079,894, 9 pages.

Luke et al., "Apparatus, Method and Article for Authentication, Security and Control of Power Storage Devices, Such as Batteries," Office Action, dated Jun. 19, 2015, U.S. Appl. No. 14/023,344, 9 pages.

Luke et al., "Apparatus, Method and Article for Authentication, Security and Control of Power Storage Devices, Such As Batteries, Based on User Profiles," Office Action, dated May 11, 2015, U.S. Appl. No. 13/559,010, 26 pages.

Luke et al., "Dynamically Limiting Vehicle Operation for Best Effort Economy," Office Action, dated Jun. 15, 2015, U.S. Appl. No. 13/559,264, 36 pages.

Wu et al., "Apparatus, Method and Article for a Power Storage Device Compartment," Office Action, dated Jun. 16, 2015, U.S. Appl. No. 13/559,125, 30 pages.

Wu et al., "Apparatus, Method and Article for Security of Vehicles," Office Action, dated Jun. 4, 2015, U.S. Appl. No. 13/671,144, 20 pages.

\* cited by examiner

APPARATUS, METHOD AND ARTICLE FOR COLLECTION, CHARGING AND DISTRIBUTING POWER STORAGE DEVICES, SUCH AS BATTERIES

CROSS REFERENCE TO RELATED APPLICATIONS

This application claims the benefit under 35 U.S.C. 119(e) of the filing date of U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012.

BACKGROUND

1. Technical Field

The present disclosure generally relates to the distribution of rechargeable electrical power storage devices (e.g., secondary batteries, super- or ultracapacitors), which may be suitable for use in a variety of fields or applications, for instance transportation and non-transportation uses.

2. Description of the Related Art

There are a wide variety of uses or applications for portable electrical power storage devices.

One such application is in the field of transportation. Hybrid and all electrical vehicles are becoming increasing common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated causing or exacerbating with various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe alternatives to combustion engines would greatly benefit the air quality, and hence health of large populations.

While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, and the relatively long time (e.g., multiple hours) necessary to recharge a secondary battery when depleted.

The approaches described herein may address some of the issues which have limited adoption of zero tailpipe emission technology, particularly in densely crowded cities, and in populations with limited financial resources.

For example, some of the approaches described herein employ collection, charging and distribution machines, which may be otherwise be termed as kiosks or vending machines, to collect, charge and distribute electrical power storage devices (e.g., batteries, super- or ultracapacitors). Such machines may be distributed about a city or other region at a variety of locations, such as convenience stores or existing gas or petrol filling stations.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as a battery or other electrical power storage device reaches approaches the end of its stored charge, an end user may simply replace, exchange or otherwise swap batteries or other electrical power storage devices. This may address issues related to cost, as well as limited range and relatively long recharging times.

As previously noted, secondary batteries and other electrical power storage devices are relatively expensive. Thus, it is beneficial to stock the least number of electrical power storage devices as possible, while still ensuring that demand for such is satisfied.

For these reasons, the ability to recharge quickly and have electrical power storage devices available is important to commercial success of any such endeavor. A number of approaches are described herein to allow quick recharging of electrical power storage devices. Such approaches generally recharge selected ones of a number of electrical power storage devices using power from an electrical service, as well as power from other ones of the electrical power storage devices selected to sacrifice charge. For example, less fully charged batteries may be used to more quickly charge more fully charged batteries. Alternatively, more fully charged batteries may be used to more quickly charge less fully charged batteries.

These approaches may be beneficial where the electrical service is limited, for example limited to a particular rating (e.g., 120 volts, 240 volts, 220 volts, 230 volts, 15 amps). Such may be particularly advantageous where collection, charging and distribution machines will be located at existing locations, such as retail or convenience stores. This may allow collection, charging and distribution machines to be installed without the expense of an upgraded electrical services, yet still achieve quicker or faster charging than could otherwise be achieved using only the existing electrical service. For example, this may avoid the need to increase electrical service from 120 volts to 240 volts and/or to go from single phase service to three phase service. These approaches may also be beneficial when electrical service to specific locations or the power grid is limited or not operating, for example due to maintenance, technical problems, weather, natural disaster and the like. When the electrical service or power grid is limited or not operating, the approaches described herein used to charge certain electrical energy storage devices may use a larger number of a second number of electrical energy storage devices to charge a first number of electrical energy storage devices compared to the number of the second number of electrical energy storage devices that are used to charge the first number of electrical energy storage devices when the electrical service and/or power grid are available and operational.

A method of operating a distribution, collection and charging machines for distribution, collection and charging of portable electrical energy storage devices, may be summarized as including identifying by a control subsystem a first number of portable electrical energy storage devices currently removably located at a first distribution, collection and charging machine to be charged at an accelerated rate relative to at least a second number of portable electrical energy storage devices currently removably located at the first distribution, collection and charging machine; charging by a charging subsystem the first number of portable electrical energy storage devices via an electrical service, where the electrical service has an associated limiting rating; and charging by the charging subsystem the first number of portable electrical energy storage devices via energy supplied from at least the second number of portable electrical energy storage devices concurrently with the charging of the first number of portable electrical energy storage devices via the electrical service.

Identifying a first number of portable electrical energy storage devices currently removably located at a first distribution, collection and charging machine to be charged at an accelerated rate relative to at least a second number of portable electrical energy storage devices currently removably located at the first distribution, collection and charging machine may include identifying for accelerated charging at least one portable electrical energy storage device which is over halfway to being fully charged.

The method of operating a distribution, collection and charging machines may further include identifying as part of the second number of portable electrical energy storage devices at least one portable electrical energy storage device which is less than halfway to being fully charged.

The method of operating a distribution, collection and charging machines may further include identifying as part of the second number of portable electrical energy storage devices any portable electrical energy storage device which are below a first threshold of being fully charged and which are also above a second threshold of being fully depleted.

Identifying a first number of portable electrical energy storage devices currently removably located at a first distribution, collection and charging machine to be charged at an accelerated rate relative to at least a second number of portable electrical energy storage devices currently removably located at the first distribution, collection and charging machine may include identifying for accelerated charging at least one portable electrical energy storage device which is more fully charged than at least another portable electrical energy storage device.

Charging the first number of portable electrical energy storage devices via energy supplied from at least the second number of portable electrical energy storage devices concurrently with the charging via the electrical service includes charging may include charging at least one more fully charged portable electrical energy storage device using energy from at least one less fully charged portable electrical energy storage device.

Identifying a first number of portable electrical energy storage devices currently removably located at a first distribution, collection and charging machine to be charged at an accelerated rate relative to at least a second number of portable electrical energy storage devices currently removably located at the first distribution, collection and charging machine may include identifying for accelerated charging at least one portable electrical energy storage device which is less than halfway to being fully charged, and identifying as part of the second number of portable electrical energy storage devices at least another portable electrical energy storage device which is more than halfway to being fully charged.

The method of operating a distribution, collection and charging machines may further include identifying as part of the second number of portable electrical energy storage devices at least one portable electrical energy storage device which is more than halfway to being fully charged.

The method of operating a distribution, collection and charging machines may further include identifying as part of the second number of portable electrical energy storage devices any portable electrical energy storage devices which are more than approximately 75 percent fully charged, for example at least 80 percent or at least 85 percent charged.

Identifying a first number of portable electrical energy storage devices currently removably located at a first distribution, collection and charging machine to be charged at an accelerated rate relative to at least a second number of portable electrical energy storage devices currently removably located at the first distribution, collection and charging machine may include identifying for accelerated charging at least one portable electrical energy storage device which is less fully charged than at least another portable electrical energy storage device.

Charging the first number of portable electrical energy storage devices via energy supplied from at least the second number of portable electrical energy storage devices concurrently with the charging via the electrical service includes charging may include charging at least one more fully charged portable electrical energy storage devices using energy from at least one less fully charged portable electrical energy storage device.

The method of operating a distribution, collection and charging machines may further include identifying as part of the second number of portable electrical energy storage devices at least one portable electrical energy storage device which is to sacrifice charge.

The method of operating a distribution, collection and charging machines may further include removably receiving an at least partially discharged portable electrical energy storage device at a first position of the first distribution, collection and charging machine at a first time, and wherein the identifying the first number of portable electrical energy storage devices currently removably located at a first distribution, collection and charging machine to be charged at an accelerated rate is performed in response to the receiving of the at least partially discharged portable electrical energy storage device at the first position of the first distribution, collection and charging machine at the first time.

Removably receiving an at least partially discharged portable electrical energy storage device at a first position of the first distribution, collection and charging machine at a first time may include removably receiving a battery sized to power a personal vehicle.

The method of operating a distribution, collection and charging machines may further include detecting an insertion of a portable electrical energy storage device at one of a plurality of positions of the first distribution, collection and charging machine; and determining a charge state of the inserted portable electrical energy storage device.

The method of operating a distribution, collection and charging machines may further include repeatedly updating the portable electrical energy storage devices identified for charging at an accelerated rate over time.

The repeatedly updating the portable electrical energy storage devices identified for charging at an accelerated rate over time may be based at least in part on a current charge condition of the portable electrical energy storage devices currently removably located at the first distribution, collection and charging machine and a rate of charging for at least one of the portable electrical energy storage devices. The repeatedly updating the portable electrical energy storage devices identified for charging at an accelerated rate over time may be based at least in part on a presence or absence of the portable electrical energy storage devices at the first distribution, collection and charging machine. The repeatedly updating the portable electrical energy storage devices identified for charging at an accelerated rate over time may be based at least in part on a total number of portable electrical energy storage devices currently removably located at the first distribution, collection and charging machine and a respective charge state of each of the portable electrical energy storage devices. The repeatedly updating the portable electrical energy storage devices identified for charging at an accelerated rate over time may be based at least in part on a total cumulative charge available from a number of portable electrical energy storage devices identified as available to sacrifice charge for charging the portable electrical energy storage devices to be charged at the accelerated rate.

Charging the first number of portable electrical energy storage devices via an electrical service may include conductively supplying electrical current to the first number of portable electrical energy storage devices via mains of an electrical service panel supplied via a metered electrical service from an external electrical grid, and wherein charging the first number of portable electrical energy storage devices via energy supplied from at least the second number of portable electrical energy storage devices may include conductively supplying electrical current from the second number of portable electrical energy storage devices.

A method of operating a distribution, collection and charging machines for distribution, collection and charging of portable electrical energy storage devices, may be summarized as including identifying by a control subsystem a first number of portable electrical energy storage devices currently removably located at a first distribution, collection and charging machine to be charged at an accelerated rate relative to at least a second number of portable electrical energy storage devices currently removably located at the first distribution, collection and charging machine; charging by a charging subsystem the first number of portable electrical energy storage devices when the electrical service is unavailable; and charging by the charging subsystem the first number of portable electrical energy storage devices is via energy supplied from at least the second number of portable electrical energy storage devices.

A distribution, collection and charging machine for distribution, collection and charging of portable electrical energy storage devices may be summarized as including a number of receivers each sized and dimensioned to removably receive respective portable electrical energy storage devices; a control subsystem including at least one controller that identifies a first number of portable electrical energy storage devices currently removably located at the distribution, collection and charging machine to be charged at an accelerated rate relative to at least a second number of portable electrical energy storage devices currently removably located at the distribution, collection and charging machine; and a charging subsystem responsive to the at least one controller to charge the first number of portable electrical energy storage devices via an electrical service and to concurrently charge the first number of portable electrical energy storage devices via energy supplied from at least the second number of portable electrical energy storage devices.

The at least one controller may identify for accelerated charging at least one portable electrical energy storage device based on the at least one portable electrical energy storage device having a respective charge state that is over halfway to being fully charged. The at least one controller may further identify as part of the second number of portable electrical energy storage devices at least one portable electrical energy storage device based on the at least one portable electrical energy storage device having a respective charge state that is less than halfway to being fully charged. The at least one controller may further identify as part of the second number of portable electrical energy storage devices any portable electrical energy storage device which has a respective charge state that is between a first threshold of being fully charged and a second threshold of being fully depleted. The at least one controller may identify for accelerated charging at least one portable electrical energy storage device which is more fully charged than at least another portable electrical energy storage device. The charging subsystem may charge at least one more fully charged portable electrical energy storage devices using energy from at least one less fully charged portable electrical energy storage device.

The at least one controller may identify for accelerated charging at least one portable electrical energy storage device based on a respective charge state being less than halfway to fully charged, and may identify as part of the second number of portable electrical energy storage devices at least another portable electrical energy storage device based on a respective charge state being more than halfway to fully charged. The at least one controller may identify as part of the second number of portable electrical energy storage devices at least one portable electrical energy storage device which is more than halfway to being fully charged. The at least one controller may further identify as part of the second number of portable electrical energy storage devices any portable electrical energy storage devices which are more than approximately 75 percent fully charged, for example more than 80 percent charged or more than 85 percent charged. The at least one controller may identify for accelerated charging at least one portable electrical energy storage device which is less fully charged than at least another portable electrical energy storage device. The charging subsystem may charge at least one more fully charged portable electrical energy storage devices using energy from at least one less fully charged portable electrical energy storage device.

The at least one controller may further identify as part of the second number of portable electrical energy storage devices at least one portable electrical energy storage device which is to sacrifice charge.

The at least one controller may identify the first number of portable electrical energy storage devices currently removably located at a first distribution, collection and charging machine to be charged at an accelerated rate may be performed in response to detection of receipt of an at least partially discharged portable electrical energy storage device at a first one of the receivers of the distribution, collection and charging machine at the first time. At least partially discharged portable electrical energy storage device removably received at the first one of the receivers of the first distribution, collection and charging machine may be a battery sized to power a personal vehicle.

The distribution, collection and charging machine may further include a first number sensors positioned and operable to detect a presence or absence of a portable electrical energy storage device at any of the receivers of the distribution, collection and charging machine; and a second number of sensors positioned and operable to detect a charge state of any portable electrical energy storage device received in a respective one of the receivers of the distribution, collection and charging machine.

The at least one controller may repeatedly update the portable electrical energy storage devices identified for charging at an accelerated rate. The at least one controller may repeatedly update the portable electrical energy storage devices identified for charging at an accelerated rate based at least in part on a current charge condition of the portable electrical energy storage devices currently removably located in respective receivers of the distribution, collection and charging machine. The at least one controller may repeatedly update the portable electrical energy storage devices identified for charging at an accelerated rate based at least in part on a presence or absence of the portable electrical energy storage devices in the receivers of the distribution, collection and charging machine. The at least one controller may repeatedly update the portable electrical energy storage devices identified for charging at an accelerated rate based at least in part on a total number of portable electrical energy storage devices currently removably received by respective receivers of the distribution, collection and charging machine and a respective charge state of each of the portable electrical energy storage devices currently removably received by respective receivers of the distribution, collection and charging machine. The at least one controller may repeatedly update the portable electrical energy storage devices identified for charging at an accelerated rate based at least in part on a total cumulative charge available from a number of portable electrical energy storage devices identified as available to sacrifice charge for charging the portable electrical energy storage devices to be charged at the accelerated rate. The charging subsystem may be electrically coupled to receive electrical power from the electrical service via mains of an electrical service panel supplied via a metered electrical service from an external electrical grid, and the charging subsystem may include a power converter operable to convert at least one of a voltage, a phase or a current of electrical power received from the metered electrical service to a form suitable for charging a portable battery sized for use in a two wheeled personal transportation vehicle.

The distribution, collection and charging machine may further include a number of electrical contacts positioned in respective ones of the receivers to electrically couple with any of the portable electrical energy storage devices removably received by the receiver; a first plurality of switches operable in response to the controller to selectively electrically couple respective ones of the electrical contacts to the power converter; and a second plurality of switches operable in response to the controller to selectively electrically couple respective ones of the electrical contacts to other ones of the electrical contacts.

A distribution, collection and charging machine for distribution, collection and charging of portable electrical energy storage devices may be summarized as including a number of receivers each sized and dimensioned to removably receive respective portable electrical energy storage devices; a control subsystem including at least one controller that identifies a first number of portable electrical energy storage devices currently removably located at the distribution, collection and charging machine to be charged at an accelerated rate relative to at least a second number of portable electrical energy storage devices currently removably located at the distribution, collection and charging machine; and a charging subsystem responsive to the at least one controller to charge the first number of portable electrical energy storage devices when an electrical service is unavailable via energy supplied from at least the second number of portable electrical energy storage devices.

A nontransitory computer-readable medium may be summarized as a nontransitory computer-readable medium that stores instructions executable by a processor to operate a distribution, collection and charging machine for distribution, collection and charging of portable electrical energy storage devices, by identifying by the processor a first number of portable electrical energy storage devices currently removably located at a first distribution, collection and charging machine to be charged at an accelerated rate relative to at least a second number of portable electrical energy storage devices currently removably located at the first distribution, collection and charging machine; causing a charging subsystem to charge the first number of portable electrical energy storage devices via an electrical service, where the electrical service has an associated limiting rating; and causing the charging system to charge the charging subsystem the first number of portable electrical energy storage devices via energy supplied from at least the second number of portable electrical energy storage devices concurrently with the charging of the first number of portable electrical energy storage devices via the electrical service.

The instructions may further cause the controller to identify the second number of portable electrical energy storage devices as including any portable electrical energy storage device which is below a first threshold of being fully charged and which is also above a second threshold of being fully depleted. The processor may identify the first number of portable electrical energy storage devices to be charged at an accelerated rate by identifying for accelerated charging at least one portable electrical energy storage device which is more fully charged than at least another portable electrical energy storage device. The instructions may cause the charging circuit to charge the at least one more fully charged portable electrical energy storage device using energy from the at least one less fully charged portable electrical energy storage device.

The controller may identify the first number of portable electrical energy storage devices to be charged at an accelerated rate by identifying for accelerated charging at least one portable electrical energy storage device which is less fully charged than at least another portable electrical energy storage device. The instructions may cause the processor to cause the charging circuit to charge at least one more fully charged portable electrical energy storage devices using energy from at least one less fully charged portable electrical energy storage device.

The instructions may further cause the processor to identify as part of the second number of portable electrical energy storage devices at least one portable electrical energy storage device which is to sacrifice charge.

The nontransitory computer-readable medium may further include repeatedly detecting insertion of any portable electrical energy storage device at any of a plurality of receivers of the first distribution, collection and charging machine; determining a charge state of the inserted portable electrical energy storage device; and repeatedly updating the portable electrical energy storage devices identified for charging at an accelerated rate over time.

The repeatedly updating the portable electrical energy storage devices identified for charging at an accelerated rate may be based at least in part on a current charge condition of the portable electrical energy storage devices currently removably located at the first distribution, collection and charging machine. The repeatedly updating the portable electrical energy storage devices identified for charging at an accelerated rate may be based at least in part on a presence or absence of the portable electrical energy storage devices at the first distribution, collection and charging machine. The repeatedly updating the portable electrical energy storage devices identified for charging at an accelerated rate may be based at least in part on a total number of portable electrical energy storage devices currently removably located at the first distribution, collection and charging machine and a respective charge state of each of the portable electrical energy storage devices. The repeatedly updating the portable electrical energy storage devices identified for charging at an accelerated rate may be based at least in part on a total cumulative charge available from a number of portable electrical energy storage devices identified as available to sacrifice charge for charging the portable electrical energy storage devices to be charged at the accelerated rate.

A nontransitory computer-readable medium may be summarized as a nontransitory computer-readable medium that stores instructions executable by a processor to operate a distribution, collection and charging machine for distribution, collection and charging of portable electrical energy storage devices, by identifying by the processor a first number of portable electrical energy storage devices currently removably located at a first distribution, collection and charging machine to be charged at an accelerated rate relative to at least a second number of portable electrical energy storage devices currently removably located at the first distribution, collection and charging machine; when an electrical service is unavailable causing a charging subsystem to charge the first number of portable electrical energy storage devices via energy supplied from at least the second number of portable electrical energy storage devices.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, super- or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, super or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
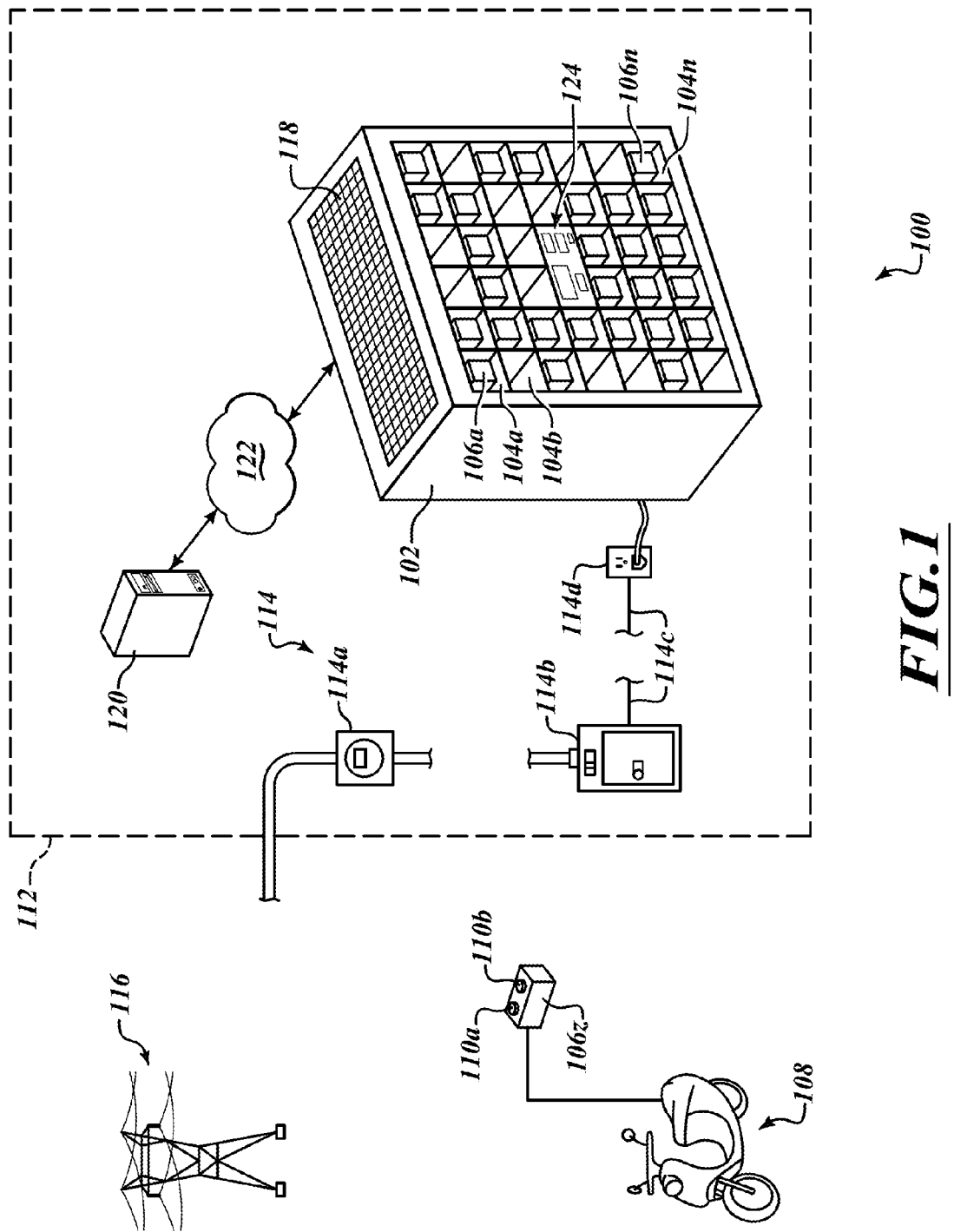
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, super- or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each or the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells) or super- or ultracapacitors (e.g., array of ultracapacitor cells). For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing. The high power electrical contacts or electrodes may be the only externally accessible couplings on the portable electrical storage device 106.

The portable electrical storage devices 106 may also contain one or more data storage or transmission devices or transponders, for example one or more radio frequency identification ("RFID") tags which may include non-transitory storage media that stores data such as an identifier unique to the portable electrical storage devices 106. Such may additionally store physical, chemical or compositional data relevant to the portable electrical power storage device 106. The portable electrical storage device 106 physical, chemical, or compositional data may include the number and type of cell(s) in the device, the health of the cell(s) in the device, the charge holding capability of the cell(s) in the device, the number of charge cycles on the cell(s) in the device, the physical configuration of the cell(s) in the device, the physical configuration and size of the device, the number, location and type or style of electrodes on the device 106, the minimum or maximum temperature of the device 106 and the like.

The collection, charging and distribution machine 102 may include an interrogator or reader that is able to read the non-transitory data stored in the one or more data storage or transmission devices or transponders in the electrical storage devices 106. Such interrogators or readers may, in some instances, generate a periodic or continuous interrogation signal that, when received, by the one or more data storage or transmission devices or transponders cause the one or more data storage or transmission devices or transponders to broadcast a signal containing the data stored therein. In some instances, the interrogator or reader in the collection, charging and distribution machine 102 may be a passive device that is able to detect signals provided by active data storage or transmission devices or transponders, for example active RFID tags that obtain transmission power from an energy storage device built in to the data storage or transmission devices or transponders or from the electrical storage device 106 itself. In some instances, the interrogator or reader in the collection, charging and distribution machine 102 may optionally write data to the one or more data storage or transmission devices or transponders in the electrical storage device 106. Such data may include incrementing a charge cycle counter, indicating a maximum usable charge capacity of the device 106, indicating the final charge level of the device 106, and the like.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, service shop. Alternatively, the collection, charging and distribution machine 102 may standalone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort.

The location 112 may include an electrical service 114 to receive electrical power from a generating station (now shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps). Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. The ability to quickly charge while maintaining existing or otherwise limited rated electrical service is addressed herein. In addition, the ability to charge while existing electrical services are unavailable due to maintenance, technical problems, weather, natural disaster, and the like is addressed herein.

Optionally, the collection, charging and distribution machine 102 may include, or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a micro-turbine (e.g., wind turbine) or PV array positioned elsewhere at the location 112, for instance on a roof top or pole mounted at a top of a pole (not shown). Alternatively, the collection, charging, and distribution machine 102 may be electrically configured to receive electrical power from portable electrical energy storage devices contained within our outside the collection, charging, and distribution machine 102, for example, when electrical service from the grid to the collection, charging, and distribution machine 102 is unavailable.

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
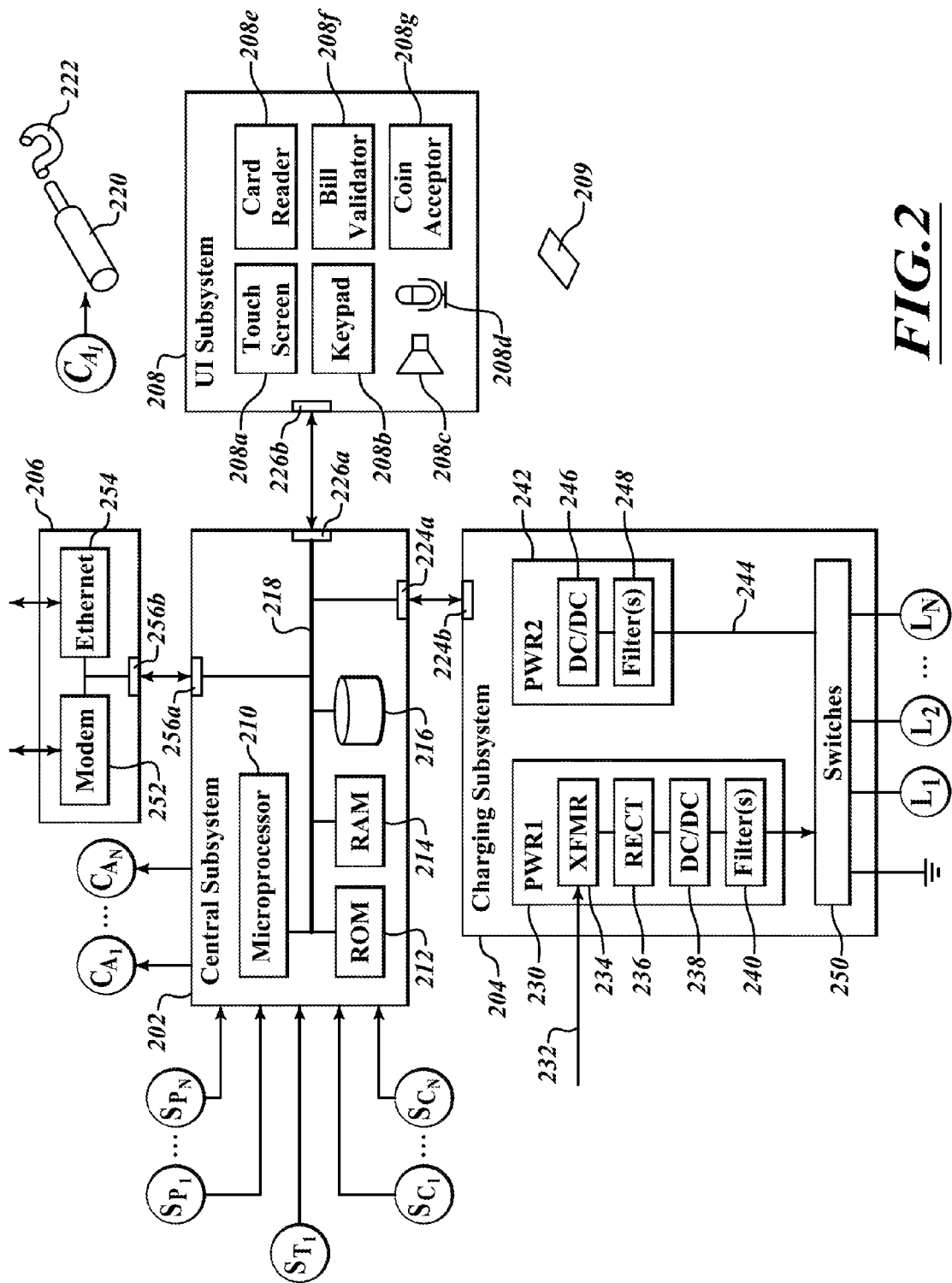
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of which causes the controller 110 to perform specific acts to cause the collection, charging and distribution machine 102 to collect, charge, and distribute portable energy storage devices. Specific operation of the collection, charging and distribution machine 102 is described below with reference to various flow diagrams (FIGS. 3-15).

The controller 210 may use RAM 214 in a conventional fashion, for volatile storage of instructions, data, etc. The controller 210 may use data store 216 to log or retain information, for example telemetric information related to collection, charging and/or distribution of collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insert of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

For example, one or more electrical service sensors may detect or sense whether the electrical service is operating at full and less than full capacity.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage devices 106 for charging. For example, the actuator may open and/or close a door to the receiver 104 (FIG. 1), to selectively provide access to a portable electrical power storage devices 106 (FIG. 1) received therein. Also for example, the actuator may open and/or close a latch or lock, allowing an end user to open and/or close a door to the receiver 104 (FIG. 1), to selectively provide access to a portable electrical power storage devices 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 102 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2 and/or discussed below. Such is not intended to be exhaustive, additional components may be employed while other components may be omitted.

The illustrated charging subsystem 204 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example to rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) may include one or more capacitors, resistors, Zener diodes or other elements to suppress voltage spikes, remove or reduce transients and/or noise.

The first power converter 230 may be a telecommunications grade power converter that is capable of providing a high quality, temperature-compensated D.C. output for safely charging maintenance free electrical power storage devices 116. However, the cost to install at least one 1 kilowatt telecommunications grade power converter within each of the receivers 104 in the charging and distribution machine 102 may be cost prohibitive, running into the tens of thousands of dollars. Consequently, the number of available first power converters 230 within the charging and distribution machine 102 may be less than the number of receivers 104. In such instances, the first power converters 230 installed in the charging and distribution machine 102 are shared among the receivers 104.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 includes a second power converter 242 that receives electrical power from one or more portable electrical power storage devices 106 (FIG. 1) via one or more lines 244, for charging other ones of the portable electrical power storage devices 106. As such, the second power converter may need to convert and/or otherwise condition the electrical power received from portable electrical power storage devices 106, for example optionally transforming voltage, current, as well as reducing transients and noise. Thus, the second power converter may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 124a, 124b from the control subsystem 202. The switches are operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two or even more portable electrical power storage devices 106. The second number or set of portable electrical power storage devices 106 may include a single portable electrical power storage device 106, two or even more portable electrical power storage devices 106. The portable electrical power storage devices 106 are represented in FIG. 2 as loads $L_1, L_2$-$L_N$.

The charging of the portable electrical power storage devices 106 can therefore be accomplished using the electrical line (i.e., mains) powered first power converters 230, the power storage device powered second power converter 242, or a combination thereof. Machine executable instructions or logic executed by the control subsystem 202 can determine the number, type, and location of the charging sources for each of the destination portable electrical power storage devices 106. For each destination portable power storage device 106, the control subsystem 202 can determine whether the device will be charged using a line powered first power converter 230, a power storage device powered second power converter 242, or a combination thereof based on factors including the availability of the first power converter 230, the number of depleted portable power storage devices 106 and the charge level of each.

In an example, the control subsystem 202 may allocate a limited number of first power converters 230 using a row or column arrangement. Under one such arrangement, the control subsystem 202 may direct the charging output from one or more first power converters 230 to only a portion of the depleted portable electrical power storage devices 106 in a given row or column, for example in a column containing ten depleted portable electrical power storage devices 106, the control subsystem 202 may direct the first power converters 230 to charge only 10% to 20% of the devices (i.e., 1 or 2 devices) while inhibiting the charging of the remaining 80% to 90% of the devices. Under another such arrangement, receivers 104 at specific row and column addresses within the charging and distribution machine 102 may be sequentially coupled to the first power converter 230, the second power converter 242, or combinations thereof. Other charging sequences based on alternating rows, alternating columns, specific receiver addresses, receiver 104 address patterns or combinations thereof are also possible.

The communicable coupling of the charging subsystem 204 to the control subsystem 202 permits the detection by the control subsystem 202 of any first power converters 230 that are added to the charging subsystem 204. As additional first power converters 230 are added, the control subsystem 202 may reconfigure or adapt the charging logic to accommodate the increased charging capabilities provided by the added first power converters 230. For example, when the control subsystem 202 detects the addition of one or more new first power converters 230, the charging limit may be increased from 10% to 20% of the portable electrical power storage devices 106 in any given row or column to 30% to 40% of the devices in any given row or column.

The communications subsystem 206 may additionally include one or more communications modules or components which facilities communications with the various components of a back end or back office system 120 (FIG. 1). The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance include media employing radio frequency identification (RFID) transponders or electronic payment chips (e.g., NFC). Thus, the card reader 208e may be able to read information from a variety of card media 209, for instance credit cards, debit cards, gift cards, prepaid cards, as well as identification media such as drivers licenses.

The user interface system 208 may also read one or more non-transitory data storage devices associated with the depleted portable electrical storage device 106 provided by the user. Data related to the portable electrical storage device 106 supplied by the user may be communicated from the user interface subsystem 208 to the control subsystem 202 via the one or more ports 226. Where differing portable electrical storage devices 106 are in use, the ability to identify one or more unique characteristics associated with the device 106 may facilitate more rapid or efficient charging of the device by the charging subsystem 204, or may permit the control subsystem 202 to identify to the user those receivers 104 containing compatible portable electrical storage devices 106 having a useable charge.

The user interface system 208 may include a bill acceptor 208*f* and validator and/or coin acceptor 208*g* to accept and validate cash payments. Such may be highly useful in servicing populations who lack access to credit. Bill acceptor and validator 208*f* and/or coin acceptor 208*g* may take any variety of forms, for example those that are currently commercially available and used in various vending machines and kiosks.

Figure 3A:
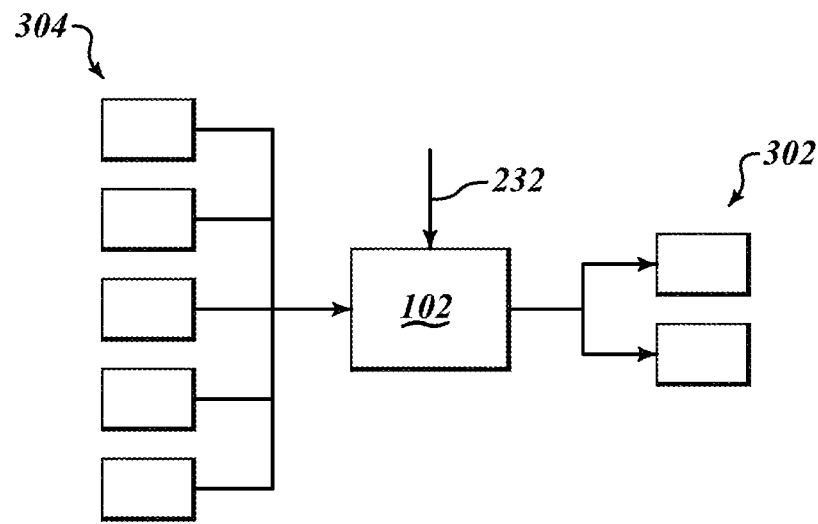
FIG. 3A shows a first number of electrical power storage devices being charged in part by charge sacrificed by a second number of electrical power storage devices, according to one illustrated embodiment of the collection, charging and distribution machine of FIGS. 1 and 2.

FIG. 3A shows the collection, charging and distribution machine 102 of FIGS. 1 and 2 charging a first number of electrical power storage devices 302 in part by charge sacrificed by a second number of electrical power storage devices 304, according to one illustrated embodiment.

In particular, the collection, charging and distribution machine 102 employs current via line 232 from the electrical service 114 (FIG. 1) and current supplied by a relatively large number of electrical power storage devices 304 which sacrifice charge to quickly or rapidly charge a smaller number of electrical power storage devices 302. The electrical power storage devices 304 which sacrifice charge may start out with relatively less charge than the electrical power storage devices 302 which receive the rapid charging. That way at least some of the electrical power storage devices 302 will rapidly attain a fully or almost fully charged state, readying such for use. Alternatively, the electrical power storage devices 304 which sacrifice charge may start out with relatively more charge than the electrical power storage devices 302 which receive the rapid charging. That way a larger number of the electrical power storage devices 302, 304 will have sufficient charge, although likely less than full charge, to make such ready for use by end users. This multiple-to-multiple approach may be implemented in parallel, concurrently across multiple pairs of receiving and sacrificing groups of electrical power storage devices 302, 304.

Figure 3B:
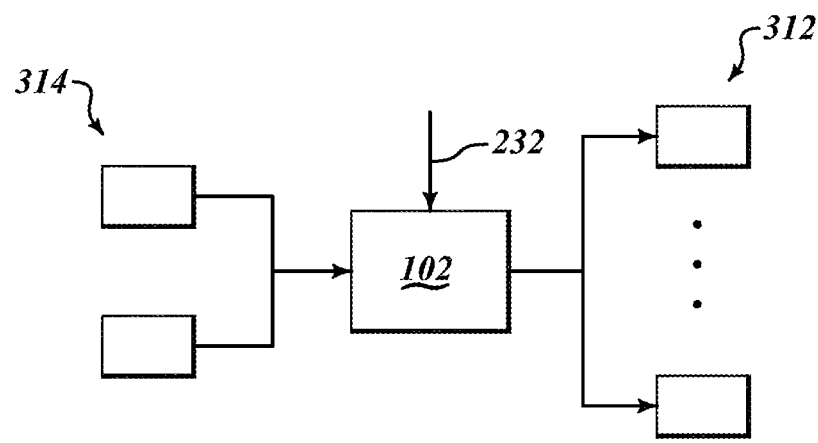
FIG. 3B shows a first number of electrical power storage devices being charged in part by charge sacrificed by a second number of electrical power storage devices, according to one illustrated embodiment of the collection, charging and distribution machine of FIGS. 1 and 2.

FIG. 3B shows the collection, charging and distribution machine 102 of FIGS. 1 and 2 charging a first number of electrical power storage devices 312 in part by charge sacrificed by a second number of electrical power storage devices 314, according to one illustrated embodiment.

In particular, the collection, charging and distribution machine 102 employs current via line 232 from the electrical service 114 (FIG. 1) and current supplied by a relatively small number of electrical power storage devices 314 which sacrifice charge to quickly or rapidly charge a larger number of electrical power storage devices 312. The electrical power storage devices 314 which sacrifice charge may start out with relatively less charge than the electrical power storage devices 312 which receive the rapid charging. That way at least some of the electrical power storage devices 312 will rapidly attain a fully or almost fully charged state, readying such for use. Alternatively, the electrical power storage devices 314 which sacrifice charge may start out with relatively more charge than the electrical power storage devices 312 which receive the rapid charging. That way a larger number of the electrical power storage devices 312, 314 will have sufficient charge, although likely less than full charge, to make such ready for use by end users. This multiple-to-multiple approach may be implemented in parallel, concurrently across multiple pairs of receiving and sacrificing groups of electrical power storage devices 312, 314.

Figure 4A:
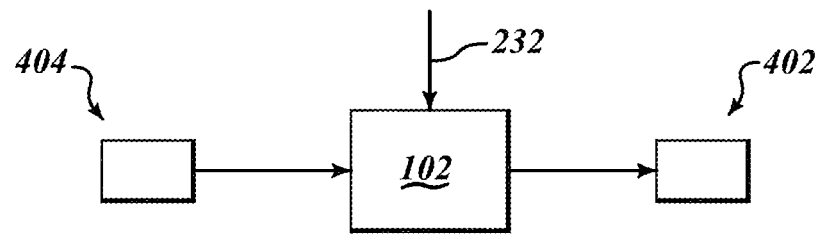
FIG. 4A shows a first single electrical power storage device being charged in part by charge sacrificed by a second single electrical power storage devices, according to one illustrated embodiment of the collection, charging and distribution machine of FIGS. 1 and 2.

FIG. 4A shows the collection, charging and distribution machine 102 of FIGS. 1 and 2 charging a first single electrical power storage device 402 in part by charge sacrificed by a second single electrical power storage device 404, according to one illustrated embodiment.

In particular, the collection, charging and distribution machine 102 employs current via line 232 from the electrical service 114 (FIG. 1) and current supplied by a single electrical power storage device 404 which sacrifice charge to quickly or rapidly charge a single electrical power storage device 402. The electrical power storage device 404 which sacrifices charge may start out with relatively less charge than the electrical power storage device 402 which receives or benefits by the rapid charging. That way the electrical power storage device 402 will rapidly attain a fully or almost fully charged state, readying such for use. Alternatively, the electrical power storage device 404 which sacrifices charge may start out with relatively more charge than the electrical power storage device 402 which receives the rapid charging. This one-to-one approach may be implemented in parallel, concurrently across multiple pairs of electrical power storage devices 402, 404. That way a larger number of the electrical power storage devices 402, 404 will have sufficient charge, although likely less than full charge, to make such ready for use by end users.

Figure 4B:
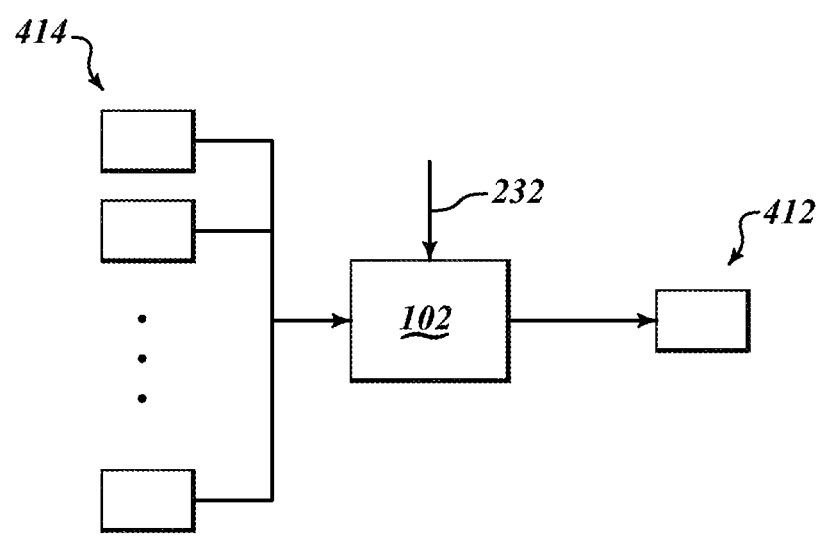
FIG. 4B shows a first single electrical power storage devices being charged in part by charge sacrificed by a second plurality of electrical power storage devices, according to one illustrated embodiment of the collection, charging and distribution machine of FIGS. 1 and 2.

FIG. 4B shows the collection, charging and distribution machine 102 of FIGS. 1 and 2 charging a first single electrical power storage device 412 in part by charge sacrificed by a plurality of electrical power storage devices 414, according to one illustrated embodiment.

In particular, the collection, charging and distribution machine 102 employs current via line 232 from the electrical service 114 (FIG. 1) and current supplied by a plurality of electrical power storage devices 414 which sacrifice charge to quickly or rapidly charge a single electrical power storage device 412. The electrical power storage devices 414 which sacrifice charge may start out with relatively less charge than the single electrical power storage device 412 which receive the rapid charging. That way the single electrical power storage device 412 will rapidly attain a fully or almost fully charged state, readying such for use. Alternatively, the plurality of electrical power storage devices 414 which sacrifice charge may start out with relatively more charge than the single electrical power storage device 412 which receive the rapid charging. This multiple-to-one approach may be implemented in parallel, concurrently across multiple pairs of receiving and sacrificing electrical power storage devices 412, 414. That way a larger number of the electrical power storage devices 412, 414 will have sufficient charge to make such ready for use by end users.

Figure 5:
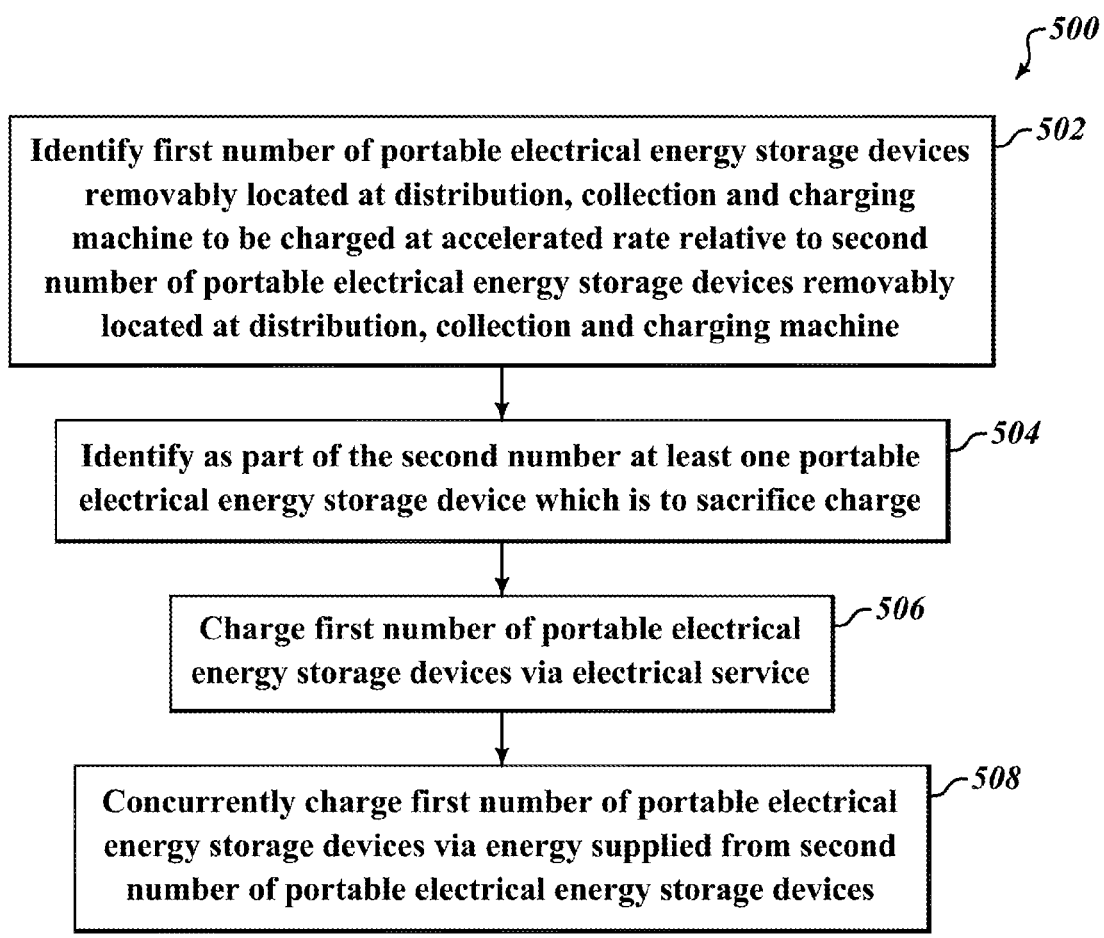
FIG. 5 is a flow diagram showing a high level method of operating the collection, charging and distribution machine of FIGS. 1 and 2 to collect, charge and distribute electrical power storage devices, according to one non-limiting illustrated embodiment.

FIG. 5 shows a high level method 500 of operating the collection, charging and distribution machine of FIGS. 1 and 2, according to one non-limiting illustrated embodiment.

At 502, the control subsystem 202 of the collection, charging and distribution machine 102 identifies a first number of portable electrical energy storage devices removably located at receivers of the distribution, collection and charging machine to be charged at accelerated rate relative to second number of portable electrical energy storage devices removably located at distribution, collection and charging machine. The control subsystem 202 may employ various criteria in identifying or selecting portable electrical energy storage devices for rapid charging relative to other portable electrical energy storage devices. For example, the control subsystem may employ relative amounts of stored charge. Some examples are set out below.

At 504, the control subsystem 202 of the collection, charging and distribution machine 102 identifies as part of the second number at least one portable electrical energy storage device which is to sacrifice charge. The control subsystem 202 may employ various criteria in identifying or selecting portable electrical energy storage devices for rapid charging relative to other portable electrical energy storage devices. For example, the control subsystem may employ relative amounts of stored charge.

At 506, the charging system 204 of the collection, charging and distribution machine 102 charges the first number of portable electrical energy storage devices with electrical power supplied via electrical service. In particular, the charging subsystem may electrically couple, for example via one or more switches (e.g., relays, contactors), portable electrical energy storage devices of the first number of set to receive charge from the electrical service. Electrical power may be supplied via one or more transformers, rectifiers, DC/DC converters and/or filters.

At 508, the charging system 204 of the collection, charging and distribution machine 102 charges the first number of portable electrical energy storage devices via energy supplied from second number of portable electrical energy storage devices, concurrently with the charging using the electrical power supplied via the electrical service or without charging using the electrical power supplied via the electrical service. In particular, the charging subsystem may electrically couple, for example via one or more switches (e.g., relays, contactors), portable electrical energy storage devices of the first number of set to receive charge from the portable electrical energy storage devices of the second number or set. Electrical power may be supplied via one or more transformers, rectifiers, DC/DC converters and/or filters.

As set out in FIG. 5, and in the other flow diagrams herein, the control subsystem 202 of the collection, charging and distribution machine 102 may employ a variety of approaches or charging schemes in order to ensure that portable electrical power storages devices such as batteries or ultracapacitor arrays are timely available with sufficient charge to satisfy expected demand. For example, in some circumstances it may be beneficial to quickly charge a relatively small number of portable electrical power storage devices at the sacrifice of a larger number of portable electrical power storage devices. Such may allow a number of completely or almost completely charged portable electrical power storage devices to be ready for an expected customer. Such may be done, for example, where there are no or relatively few completely or almost completely charged portable electrical power storage devices available at the collection, charging and distribution machine 102 (e.g., kiosk, vending machine). In other circumstances, it may be beneficial to quickly charge a relatively large number of portable electrical power storage devices at the sacrifice of a smaller number of portable electrical power storage devices. Such may allow a number of completely or almost completely discharged portable electrical power storage devices to be partially charged to a satisfactory level and hence ready for expected customers. Such may be done, for example, where there are a large number of completely or almost completely discharged portable electrical power storage devices present at the collection, charging and distribution machine 102.

Thus, the identification of which and how many portable electrical power storage devices will be quickly charged, as well as the identification of which and how many portable electrical power storage devices will sacrifice charge to achieve such may be based on a variety of criteria. A non-exhaustive list of criteria may, for example, include one or more the total number of portable electrical power storage devices present at the collection, charging and distribution machine 102, the various charge states of the portable electrical power storage devices, the amount or lack of electrical power available from external sources such as via the electrical service or some renewable power source, the actual or expect rate of charging, the time of day or expected demand or cost for electrical power supplied by an external source (e.g., peak versus non-peak periods), and even the temperature of the ambient environment or the temperature within the receivers of the collection, charging and distribution machine 102.

Figure 6:
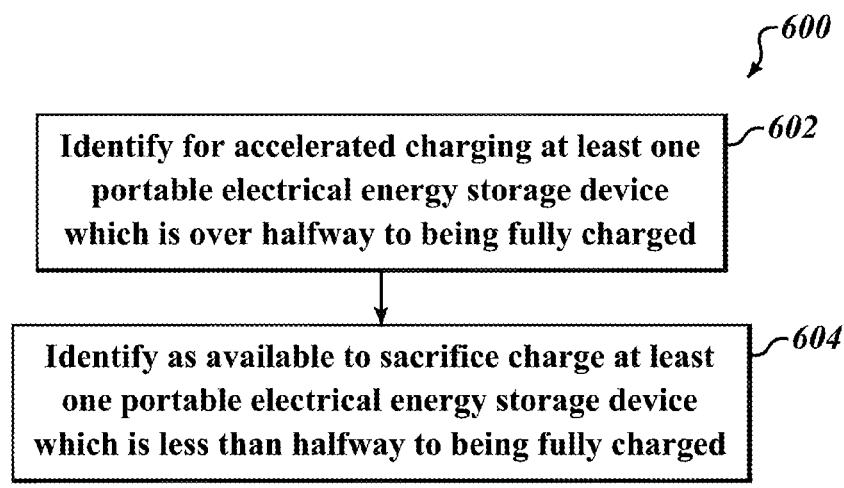
FIG. 6 is a flow diagram showing a low level method of operating the collection, charging and distribution machine of FIGS. 1 and 2 according to one non-limiting illustrated embodiment, including identifying specific portable electrical energy storage devices for either accelerated charging or to sacrifice charge, useful in the method of FIG. 3.

FIG. 6 shows a low level method 600 of operating the collection, charging and distribution machine of FIGS. 1 and 2 according to one non-limiting illustrated embodiment. The method 600 may be useful in the performing a portion of the method 500 of FIG. 5.

At 602, the control subsystem 202 of the collection, charging and distribution machine 102 identifies for accelerated charging at least one portable electrical energy storage device which is over halfway to being fully charged.

At 604, the control subsystem 202 of the collection, charging and distribution machine 102 identifies as available to sacrifice charge at least one portable electrical energy storage device which is less than halfway to being fully charged.

In this way, a first number of portable electrical energy storage device which are relatively closer to being charged than a second number of portable electrical energy storage device may be selected for being rapidly charged relative to the other portable electrical energy storage devices. This may help ensure that at least one portable electrical energy storage device is available at the collection, charging and distribution machine 102 for use by an end user.

Figure 7:
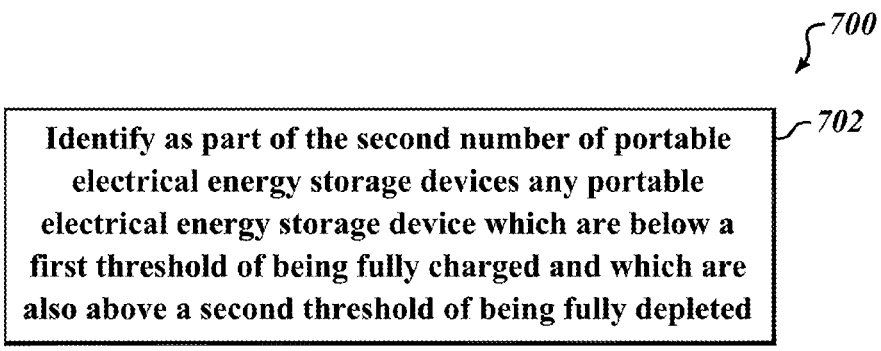
FIG. 7 is a flow diagram showing a low level method of operating the collection, charging and distribution machine of FIGS. 1 and 2 according to one non-limiting illustrated embodiment, including identifying specific portable electrical energy storage devices to sacrifice charge, useful in the method of FIG. 3.

FIG. 7 shows a low level method 700 of operating the collection, charging and distribution machine of FIGS. 1 and 2 according to one non-limiting illustrated embodiment. The method 700 may be useful in performing a portion of the method 500 of FIG. 5.

At 702, the control subsystem 202 of the collection, charging and distribution machine 102 identifies as part of the second number of portable electrical energy storage devices any portable electrical energy storage device which are below a first threshold of being fully charged and which are also above a second threshold of being fully depleted.

This may allow a first set of portable electrical energy storage devices to be identified for repaid charging, a second set of portable electrical energy storage devices identified for sacrificing charge, and a third set which is neither rapidly charged nor which sacrifice charge. For example, some of the most fully charged portable electrical energy storage devices may be identified for rapid charging, while some of the least fully charged are identified neither for rapid charging nor for sacrificing charge. Rather, portable electrical energy storage devices with an intermediate level of charge (i.e., leaving some significant charge to sacrifice) may be identified for sacrificing charge. This may prevent the least fully charged portable electrical energy storage devices from being driven to no or substantially no charge states.

Figure 8:
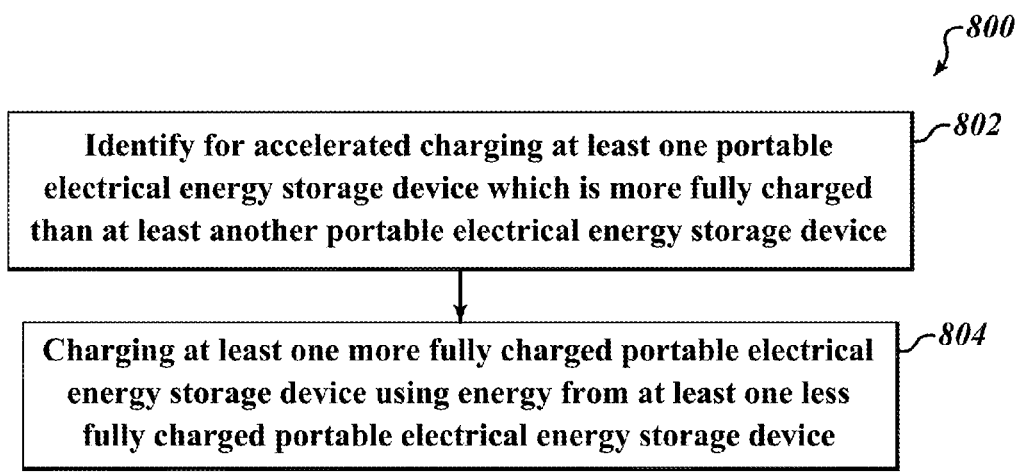
FIG. 8 is a flow diagram showing a low level method of operating the collection, charging and distribution machine of FIGS. 1 and 2 according to one non-limiting illustrated embodiment, including identifying specific portable electrical energy storage devices for accelerated charging and charging the selected devices, useful in the method of FIG. 3.

FIG. 8 show a low level method 800 of operating the collection, charging and distribution machine of FIGS. 1 and 2 according to one non-limiting illustrated embodiment. The method 800 may be useful in performing a portion of the method 500 of FIG. 5.

At 802, the control subsystem 202 of the collection, charging and distribution machine 102 identifies for accelerated charging at least one portable electrical energy storage device which is more fully charged than at least another portable electrical energy storage device.

At 804, the charging subsystem 204 of the collection, charging and distribution machine 102 charges at least one more fully charged portable electrical energy storage device using energy from at least one less fully charged portable electrical energy storage device.

This may help ensure that at least one portable electrical energy storage device fully or almost fully charged is available at the collection, charging and distribution machine 102 for use by an end user.

Figure 9:
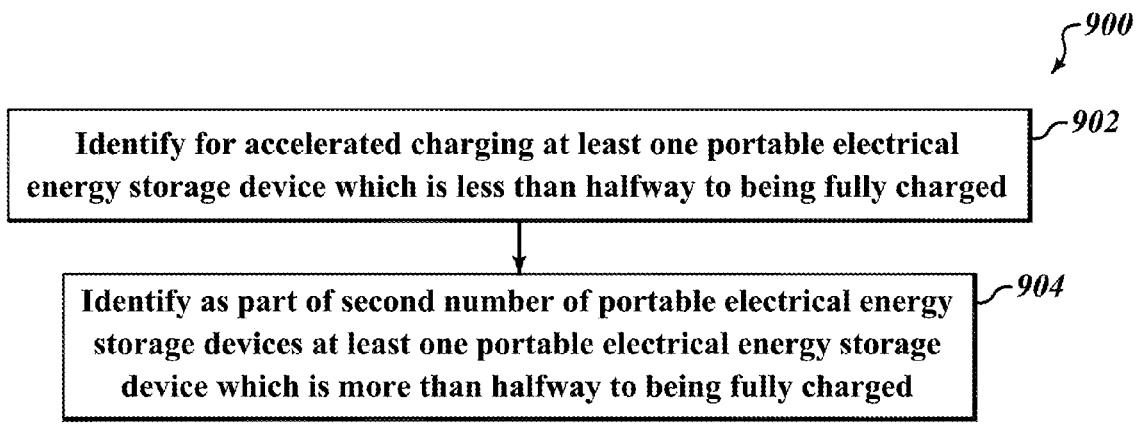
FIG. 9 is a flow diagram showing a low level method of operating the collection, charging and distribution machine of FIGS. 1 and 2 according to one non-limiting illustrated embodiment including identifying specific portable electrical energy storage devices for either accelerated charging or to sacrifice charge, useful in the method of FIG. 3.

FIG. 9 shows a low level method 900 of operating the collection, charging and distribution machine of FIGS. 1 and 2 according to one non-limiting illustrated embodiment. The method 900 may be useful in performing a portion of the method 500 of FIG. 5.

At 902, the control subsystem 202 of the collection, charging and distribution machine 102 identifies for accelerated charging at least one portable electrical energy storage device which is less than halfway to being fully charged.

At 904, the control subsystem 202 of the collection, charging and distribution machine 102 identifies as part of second number of portable electrical energy storage devices at least one portable electrical energy storage device which is more than halfway to being fully charged.

Thus, the control subsystem 202 of the collection, charging and distribution machine 102 may attempt to bring as many portable electrical energy storage devices as possible up to some average or median level of charge. This may ensure that large demand may be met, even where the portable electrical energy storage devices supplied are not fully charged.

Figure 10:
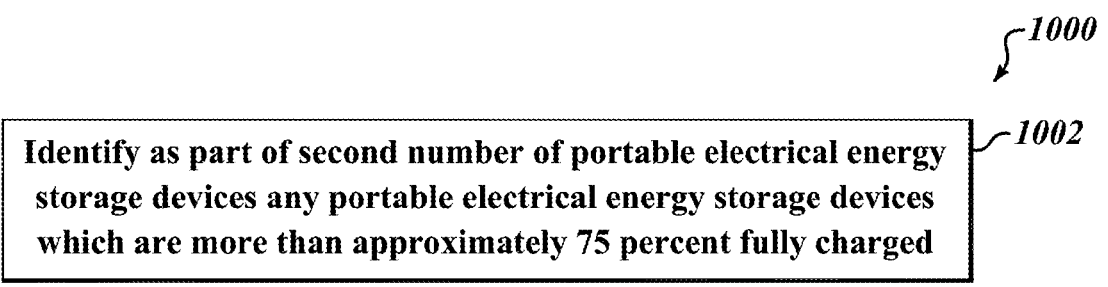
FIG. 10 is a flow diagram showing a low level method of operating the collection, charging and distribution machine of FIGS. 1 and 2 according to one non-limiting illustrated embodiment, including identifying specific portable electrical energy storage devices to sacrifice charge, useful in the method of FIG. 3.

FIG. 10 shows a low level method 1000 of operating the collection, charging and distribution machine of FIGS. 1 and 2 according to one non-limiting illustrated embodiment. The method 1000 may be useful in performing a portion of the method 500 of FIG. 5.

At 1002, the control subsystem 202 of the collection, charging and distribution machine 102 identifies as part of second number of portable electrical energy storage devices any portable electrical energy storage devices which are more than approximately 75 percent fully charged, or more than approximately 80 percent fully charged or even more than approximately 85 percent fully charged.

This ensures that portable electrical energy storage devices with a relatively good likelihood of being satisfactorily charged over some relatively short period of time, will be ready for distribution to an end user when needed or requested. The values of 75, 80 and 85 percent is significant since, at least for secondary chemical batteries, the charge time or rate tends to increase non-linearly (e.g., exponential) with amount of stored charge, and it takes significantly longer to obtain the last percent (e.g., 25, 20, 15 percent) of charge than the first percent of charge (e.g., 25, 30, 35 percent). Likewise, the discharge time or rate also appears to be non-linear. The nonlinearity of charging and discharging rates may not be as pronounced for arrays of ultracapacitors as compared to secondary chemical batteries, so other trigger or threshold charge values may be appropriate. Yet a charge of 75, 80 or 85 percent of rated or nominal capacity may be sufficient to satisfy customer demand and obtain a desired range of travel. Thus, the selection algorithm executed by the control subsystem 202 may take into account a nominal charge rate curve of the particular type of electrical energy storage devices to be charged and/or a nominal discharge rate curve of the particular type of electrical energy storage devices which will sacrifice the charge.

Figure 11:
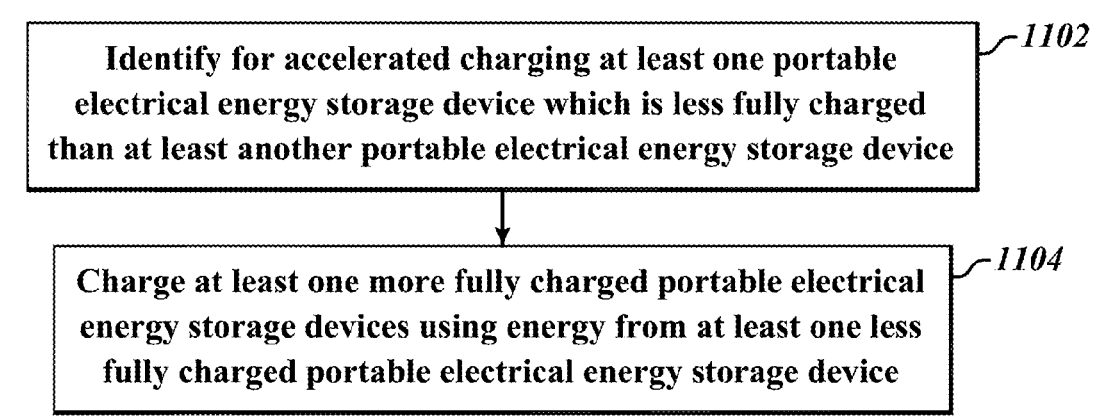
FIG. 11 is a flow diagram showing a low level method of operating the collection, charging and distribution machine of FIGS. 1 and 2 according to one non-limiting illustrated embodiment, including identifying specific portable electrical energy storage devices for accelerated charging and charging the selected devices, useful in the method of FIG. 3.

FIG. 11 shows a low level method 1100 of operating the collection, charging and distribution machine of FIGS. 1 and 2 according to one non-limiting illustrated embodiment. The method 1100 may be useful in performing a portion of the method 500 of FIG. 5.

At 1102, the control subsystem 202 of the collection, charging and distribution machine 102 identifies for accelerated charging at least one portable electrical energy storage device which is less fully charged than at least another portable electrical energy storage device.

At 1104, the charging subsystem 204 of the collection, charging and distribution machine 102 charges at least one more fully charged portable electrical energy storage devices using energy from at least one less fully charged portable electrical energy storage device.

This ensures that a relatively large number of portable electrical energy storage devices will be ready to met relatively large demand, even if none or few are completely charged.

Figure 12:
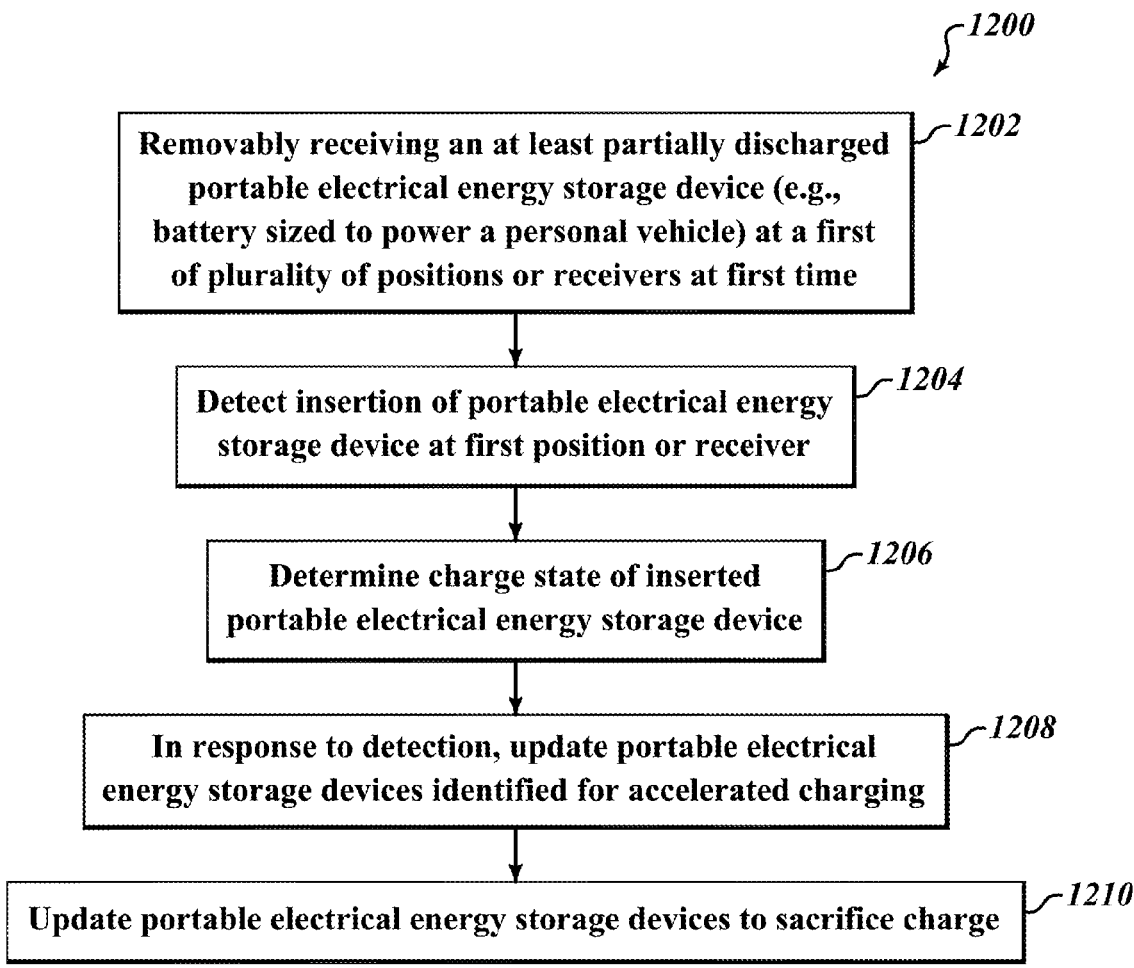
FIG. 12 is a flow diagram showing a low level method of operating the collection, charging and distribution machine of FIGS. 1 and 2 according to one non-limiting illustrated embodiment, including detecting insertion of a portable electrical energy storage device, determining a charge state of such, and in response updating identification of devices for accelerated charging, useful in the method of FIG. 3.

FIG. 12 shows a low level method 1200 of operating the collection, charging and distribution machine of FIGS. 1 and 2 according to one non-limiting illustrated embodiment. The method 1200 may be useful in performing a portion of the method 500 of FIG. 5.

At 1202, the collection, charging and distribution machine 102 removably receives an at least partially discharged portable electrical energy storage device at a first of plurality of positions or receivers 104 at first time.

At 1204, one or more sensors of the collection, charging and distribution machine 102 detect insertion of the portable electrical energy storage device at the first position or receiver 104.

At 1206, the control subsystem 202 of the collection, charging and distribution machine 102 determines a charge state of inserted portable electrical energy storage device. For example, the control subsystem 202 may rely on one or more current sensors.

In response to detection of an at least partially discharged portable electrical energy storage device being inserted in a receiver, at 1208 the control subsystem 202 of the collection, charging and distribution machine 102 updates the identification of the first number of portable electrical energy storage devices identified for accelerated charging. For example, the control subsystem 202 may add one or more specific portable electrical energy storage devices to the number or set to be rapidly charged and/or may subtract or remove one or more specific portable electrical energy storage devices from the number or set to be rapidly charged.

For example, the control system may include in the number, set or list of portable electrical energy storage devices to be rapidly charged: 1) the most fully charged portable electrical energy storage devices, 2) a defined number of the most fully charged portable electrical energy storage devices; 3) a defined percentage of the total number of portable electrical energy storage devices, including those which are most fully charged; and/or 4) portable electrical energy storage devices above a defined charge threshold. Alternatively, the control system may include in the number, set or list of portable electrical energy storage devices to be rapidly charged: 1) the least fully charged portable electrical energy storage devices, 2) a defined number of the least fully charged portable electrical energy storage devices; 3) a defined percentage of the total number of portable electrical energy storage devices, including those which are least fully charged; and/or 4) portable electrical energy storage devices below a defined charge threshold. As a further alternative, the control system may include in the number, set or list of portable electrical energy storage devices to be rapidly charged, 1) the one or more portable electrical energy storage devices with a median charge relative to one or more other more fully and less fully charged portable electrical energy storage devices. Examples of such are discussed below with reference to FIGS. 13-16.

At 1210, the control subsystem 202 may update the identification of the second number of portable electrical energy storage devices identified for sacrificing charging. For example, the control subsystem 202 may add one or more specific portable electrical energy storage devices to the number or set to sacrifice charge and/or may subtract or remove one or more specific portable electrical energy storage devices from the number or set to sacrifice charge.

For example, the control system may include in the number, set or list of portable electrical energy storage devices to sacrifice charge: 1) the most fully charged portable electrical energy storage devices, 2) a defined number of the most fully charged portable electrical energy storage devices; 3) a defined percentage of the total number of portable electrical energy storage devices, including those which are most fully charged; and/or 4) portable electrical energy storage devices above a defined charge threshold. Alternatively, the control system may include in the number, set or list of portable electrical energy storage devices to sacrifice charge: 1) the least fully charged portable electrical energy storage devices, 2) a defined number of the least fully charged portable electrical energy storage devices; 3) a defined percentage of the total number of portable electrical energy storage devices, including those which are least fully charged; and/or 4) portable electrical energy storage devices below a defined charge threshold. As a further alternative, the control system may include in the number, set or list of portable electrical energy storage devices to sacrifice charge: 1) the one or more portable electrical energy storage devices with a median charge relative to one or more other more fully and less fully charged portable electrical energy storage devices.

Figure 13:
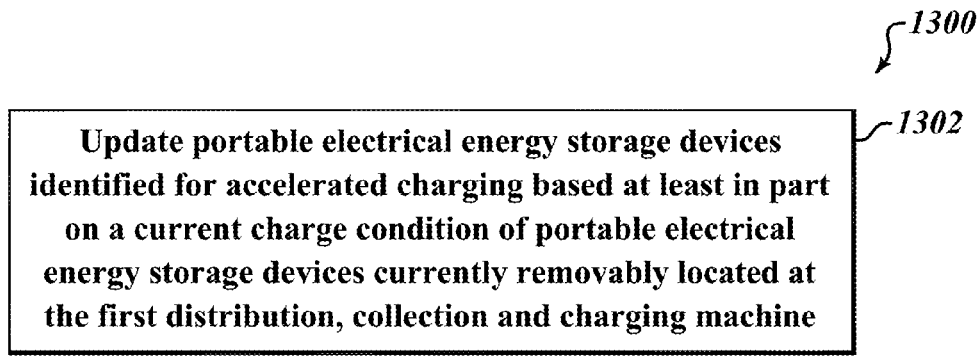
FIG. 13 is a flow diagram showing a low level method of operating the collection, charging and distribution machine of FIGS. 1 and 2 according to one non-limiting illustrated embodiment, including updating portable electrical energy devices identified for accelerated charging based at least in part on a current (i.e., temporal) charge condition, useful in the method of FIG. 3.

FIG. 13 shows a low level method 1300 of operating the collection, charging and distribution machine of FIGS. 1 and 2 according to one non-limiting illustrated embodiment. The method 1300 may be useful in performing a portion of the method 500 of FIG. 5.

At 1302, the control subsystem 202 may update portable electrical energy storage devices identified for accelerated charging based at least in part on a current charge condition of portable electrical energy storage devices currently removably located at the first distribution, collection and charging machine. For example, portable electrical energy storage devices storing relatively large amounts of charge may be rapidly charge to full charge levels, at the sacrifice of less fully charged portable electrical energy storage devices. Alternatively, portable electrical energy storage devices storing relatively large amounts of charge may sacrifice charge to rapidly charge less fully charged portable electrical energy storage devices to acceptable levels for distribution.

Figure 14:
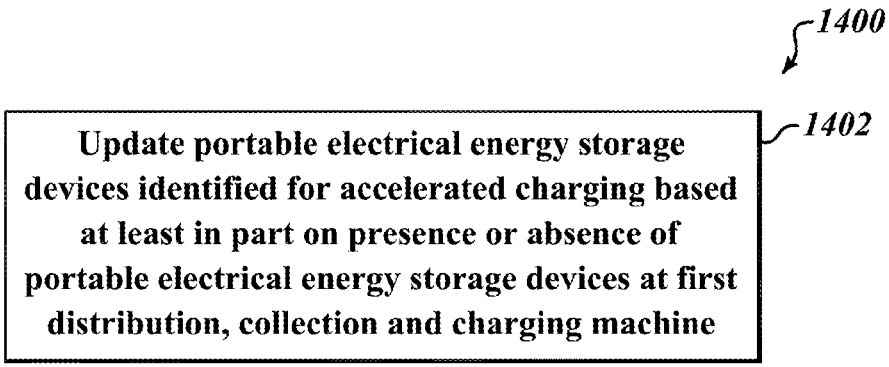
FIG. 14 is a flow diagram showing a low level method of operating the collection, charging and distribution machine of FIGS. 1 and 2 according to one non-limiting illustrated embodiment, including updating portable electrical energy devices identified for accelerated charging based at least in part on detection of a presence or absence of such devices, useful in the method of FIG. 3.

FIG. 14 shows a low level method 1400 of operating the collection, charging and distribution machine of FIGS. 1 and 2 according to one non-limiting illustrated embodiment. The method 1400 may be useful in performing a portion of the method 500 of FIG. 5.

At 1402, the control subsystem 202 may update the first number or set of portable electrical energy storage devices identified for accelerated charging based at least in part on a presence or absence of the portable electrical energy storage devices at the first distribution, collection and charging machine. For example, the control subsystem may take into account the total number of portable electrical energy storage devices located or present at the respective collection, charging and distribution machine.

Figure 15:
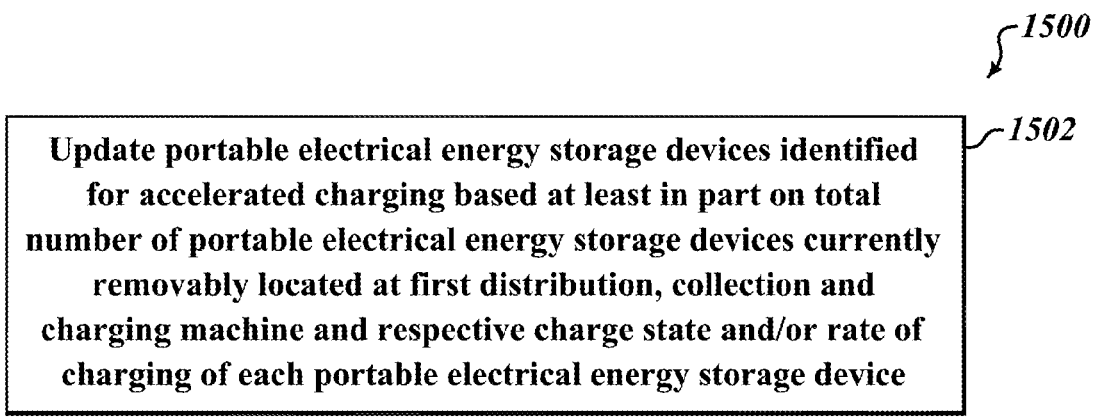
FIG. 15 is a flow diagram showing a low level method of operating the collection, charging and distribution machine of FIGS. 1 and 2 according to another non-limiting illustrated embodiment, including updating portable electrical energy devices identified for accelerated charging based at least in part on a total number and respective charge state of such devices, useful in the method of FIG. 3.

FIG. 15 shows a low level method 1500 of operating the collection, charging and distribution machine of FIGS. 1 and 2 according to another non-limiting illustrated embodiment. The method 1500 may be useful in performing a portion of the method 500 of FIG. 5.

At 1502, the control subsystem 202 may update portable electrical energy storage devices identified for accelerated charging based at least in part on a total number of portable electrical energy storage devices currently removably located at the first distribution, collection and charging machine, a respective charge state of each of the portable electrical energy storage devices, and a rate of charging for at least one of the portable electrical energy storage devices. For example, the control subsystem may take into account the total number of portable electrical energy storage devices located or present at the respective collection, charging and distribution machine and the relative charge state of each. Thus, the control subsystem 202 may determine that there are sufficient portable electrical energy storage devices with sufficient charge to sacrifice charge to bring some other portable electrical energy storage devices up to or close to fully charged. Alternatively, the control subsystem 202 may determine that there are not sufficient portable electrical energy storage devices with sufficient charge to sacrifice charge. Alternatively, the control subsystem 202 may determine that there are sufficient number of portable electrical energy storage devices sufficiently charged that no sacrifice is necessary.

Figure 16:
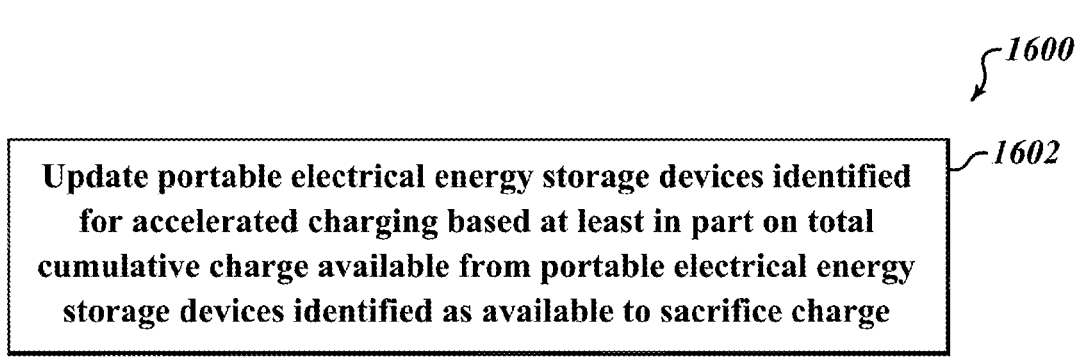
FIG. 16 is a flow diagram showing a low level method of operating the collection, charging and distribution machine of FIGS. 1 and 2 according to another non-limiting illustrated embodiment, including updating portable electrical energy devices identified for accelerated charging based at least in part on a total cumulative charge available for sacrifice, useful in the method of FIG. 3.

FIG. 16 shows a low level method 1600 of operating the collection, charging and distribution machine of FIGS. 1 and 2 according to another non-limiting illustrated embodiment. The method 1600 may be useful in performing a portion of the method 500 of FIG. 5.

At 1602, the control subsystem 202 may update portable electrical energy storage devices identified for accelerated charging based at least in part on total cumulative charge available from portable electrical energy storage devices identified as available to sacrifice charge. Thus, the control subsystem 202 may take into account total charge to ensure that at least some portable electrical energy storage devices are available at or proximate fully charged condition or state. Alternatively the control subsystem may ensure that a maximum or relatively large number of portable electrical energy storage devices are available, even if not at or proximate a fully charged condition or state.

Figure 17:
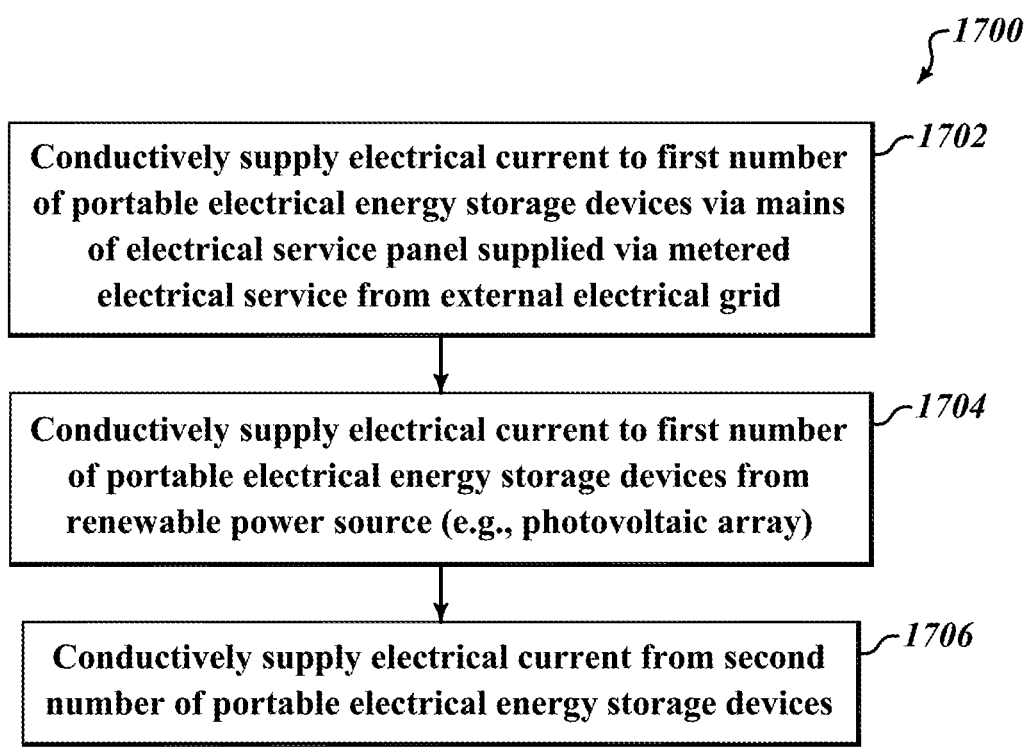
FIG. 17 is a flow diagram showing a low level method of operating the collection, charging and distribution machine of FIGS. 1 and 2 according to one non-limiting illustrated embodiment, including conductively supplying current to portable electrical power storage devices selected for accelerated concurrently from an electrical service and from at least one portable electrical power storage device selected to sacrifice charge, useful in the method of FIG. 3.

FIG. 17 shows a low level method 1700 of operating the collection, charging and distribution machine of FIGS. 1 and 2 according to one non-limiting illustrated embodiment. The method 1700 may be useful in the method 500 of FIG. 5.

At 1702, the charging subsystem 204 of the collection, charging and distribution machine 102 conductively supplies electrical current to the first number of portable electrical energy storage devices via mains of an electrical service panel supplied via a metered electrical service from an external electrical grid. The charging subsystem 204 may close one or more switches to electrically couple the first number of portable electrical energy storage devices to the electrical service, via a first power converter 230 (FIG. 2).

Optionally at 1704, the charging subsystem 204 conductively supplies electrical current to the first number of portable electrical energy storage devices via a renewable power source (e.g., photovoltaic array 118 (FIG. 1). The charging subsystem 204 may close one or more switches to electrically couple the first number of portable electrical energy storage devices to the PV array 118 via the first power converter 230 (FIG. 2) or some dedicated power converter (not illustrated).

At 1706, the charging subsystem 204 conductively supplies electrical current from the second number of portable electrical energy storage devices. The charging subsystem 204 may close one or more switches to electrically couple the first number of portable electrical energy storage devices to the electrical service, via a second power converter 242 (FIG. 2).

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,038 filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES", U.S. application Ser. No. 13/559,264 filed on Jul. 26, 2012 naming Hok-Sum Horace Luke and Matthew Whiting Taylor as inventors and entitled "DYNAMICALLY LIMITING VEHICLE OPERATION FOR BEST EFFORT ECONOMY", U.S. application Ser. No. 13/559,054 filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390 filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343 filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,064 filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating at least one distribution, collection and charging machine for distribution, collection and charging of portable electrical energy storage devices, the method comprising:

identifying by a control subsystem a first number of portable electrical energy storage devices currently removably located at a first distribution, collection and charging machine to be charged at an accelerated rate relative to at least a second number of portable electrical energy storage devices currently removably located at the first distribution, collection and charging machine, wherein identifying a first number of portable electrical energy storage devices currently removably located at a first distribution, collection and charging machine to be charged at an accelerated rate relative to at least a second number of portable electrical energy storage devices currently removably located at the first distribution, collection and charging machine includes identifying for accelerated charging at least one portable electrical energy storage device which is over halfway to being fully charged;

charging by a charging subsystem the first number of portable electrical energy storage devices via an electrical service, where the electrical service has an associated limiting rating; and charging by the charging subsystem the first number of portable electrical energy storage devices via energy supplied from at least the second number of portable electrical energy storage devices concurrently with the charging of the first number of portable electrical energy storage devices via the electrical service.

2. The method of claim 1, further comprising:

identifying as part of the second number of portable electrical energy storage devices at least one portable electrical energy storage device which is less than halfway to being fully charged.

3. The method of claim 1, further comprising:

identifying as part of the second number of portable electrical energy storage devices any portable electrical energy storage device which are below a first threshold of being fully charged and which are also above a second threshold of being fully depleted.

4. The method of claim 1 wherein identifying a first number of portable electrical energy storage devices currently removably located at a first distribution, collection and charging machine to be charged at an accelerated rate relative to at least a second number of portable electrical energy storage devices currently removably located at the first distribution, collection and charging machine includes identifying for accelerated charging at least one portable electrical energy storage device which is more fully charged than at least another portable electrical energy storage device.

5. The method of claim 1 wherein charging the first number of portable electrical energy storage devices via energy supplied from at least the second number of portable electrical energy storage devices concurrently with the charging via the electrical service includes charging includes charging at least one more fully charged portable electrical energy storage device using energy from at least one less fully charged portable electrical energy storage device.

6. The method of claim 1 wherein identifying a first number of portable electrical energy storage devices currently removably located at a first distribution, collection and charging machine to be charged at an accelerated rate relative to at least a second number of portable electrical energy storage devices currently removably located at the first distribution, collection and charging machine further includes identifying for accelerated charging at least one portable electrical energy storage device which is less than halfway to being fully charged, and identifying as part of the second number of portable electrical energy storage devices at least another portable electrical energy storage device which is more than halfway to being fully charged.

7. The method of claim 1, further comprising:
identifying as part of the second number of portable electrical energy storage devices at least one portable electrical energy storage device which is more than halfway to being fully charged.

8. The method of claim 7, further comprising:
identifying as part of the second number of portable electrical energy storage devices any portable electrical energy storage devices which are more than approximately 80-85 percent fully charged.

9. The method of claim 1 wherein identifying a first number of portable electrical energy storage devices currently removably located at a first distribution, collection and charging machine to be charged at an accelerated rate relative to at least a second number of portable electrical energy storage devices currently removably located at the first distribution, collection and charging machine includes identifying for accelerated charging at least one portable electrical energy storage device which is less fully charged than at least another portable electrical energy storage device.

10. The method of claim 9 wherein charging the first number of portable electrical energy storage devices via energy supplied from at least the second number of portable electrical energy storage devices concurrently with the charging via the electrical service includes charging includes charging at least one more fully charged portable electrical energy storage devices using energy from at least one less fully charged portable electrical energy storage device.

11. The method of claim 1, further comprising:
identifying as part of the second number of portable electrical energy storage devices at least one portable electrical energy storage device which is to sacrifice charge.

12. The method of claim 1, further comprising:
removably receiving an at least partially discharged portable electrical energy storage device at a first position of the first distribution, collection and charging machine at a first time, and wherein the identifying the first number of portable electrical energy storage devices currently removably located at a first distribution, collection and charging machine to be charged at an accelerated rate is performed in response to the receiving of the at least partially discharged portable electrical energy storage device at the first position of the first distribution, collection and charging machine at the first time.

13. The method of claim 12 wherein removably receiving an at least partially discharged portable electrical energy storage device at a first position of the first distribution, collection and charging machine at a first time includes removably receiving a battery sized to power a personal vehicle.

14. The method of claim 1, further comprising:
detecting an insertion of a portable electrical energy storage device at one of a plurality of positions of the first distribution, collection and charging machine; and
determining a charge state of the inserted portable electrical energy storage device.

15. The method of claim 1, further comprising:
repeatedly updating the portable electrical energy storage devices identified for charging at an accelerated rate over time.

16. The method of claim 15 wherein the repeatedly updating the portable electrical energy storage devices identified for charging at an accelerated rate over time is based at least in part on a current charge condition of the portable electrical energy storage devices currently removably located at the first distribution, collection and charging machine and a rate of charging for at least one of the portable electrical energy storage devices.

17. The method of claim 15 wherein the repeatedly updating the portable electrical energy storage devices identified for charging at an accelerated rate over time is based at least in part on a presence or absence of the portable electrical energy storage devices at the first distribution, collection and charging machine.

18. The method of claim 15 wherein the repeatedly updating the portable electrical energy storage devices identified for charging at an accelerated rate over time is based at least in part on a total number of portable electrical energy storage devices currently removably located at the first distribution, collection and charging machine and a respective charge state of each of the portable electrical energy storage devices.

19. The method of claim 18 wherein the repeatedly updating the portable electrical energy storage devices identified for charging at an accelerated rate over time is based at least in part on a total cumulative charge available from a number of portable electrical energy storage devices identified as available to sacrifice charge for charging the portable electrical energy storage devices to be charged at the accelerated rate.

20. The method of claim 1 wherein charging the first number of portable electrical energy storage devices via an electrical service includes conductively supplying electrical current to the first number of portable electrical energy storage devices via mains of an electrical service panel supplied via a metered electrical service from an external electrical grid, and wherein charging the first number of portable electrical energy storage devices via energy supplied from at least the second number of portable electrical energy storage devices includes conductively supplying electrical current from the second number of portable electrical energy storage devices.

21. A distribution, collection and charging machine for distribution, collection and charging of portable electrical energy storage devices, comprising:
a number of receivers each sized and dimensioned to removably receive respective portable electrical energy storage devices;
a control subsystem including at least one controller that identifies a first number of portable electrical energy storage devices currently removably located at the distribution, collection and charging machine to be charged at an accelerated rate relative to at least a second number of portable electrical energy storage devices currently removably located at the distribution, collection and charging machine, wherein the at least one controller identifies for accelerated charging at least one portable electrical energy storage device based on the at least one portable electrical energy storage device having a respective charge state that is over halfway to being fully charged; and
a charging subsystem responsive to the at least one controller to charge the first number of portable electrical energy storage devices via an electrical service and to concurrently charge the first number of portable electrical energy storage devices via energy supplied from at least the second number of portable electrical energy storage devices.

22. The distribution, collection and charging machine of claim 21 wherein the at least one controller further identifies as part of the second number of portable electrical energy storage devices at least one portable electrical energy storage device based on the at least one portable electrical energy storage device having a respective charge state that is less than halfway to being fully charged.

23. The distribution, collection and charging machine of claim 21 wherein the at least one controller further identifies as part of the second number of portable electrical energy storage devices any portable electrical energy storage device which has a respective charge state that is between a first threshold of being fully charged and a second threshold of being fully depleted.

24. The distribution, collection and charging machine of claim 21 wherein the at least one controller identifies for accelerated charging at least one portable electrical energy storage device which is more fully charged than at least another portable electrical energy storage device.

25. The distribution, collection and charging machine of claim 24 wherein the charging subsystem charges at least one more fully charged portable electrical energy storage devices using energy from at least one less fully charged portable electrical energy storage device.

26. The distribution, collection and charging machine of claim 21 wherein the at least one controller further identifies for accelerated charging at least one portable electrical energy storage device based on a respective charge state being less than halfway to fully charged, and identifies as part of the second number of portable electrical energy storage devices at least another portable electrical energy storage device based on a respective charge state being more than halfway to fully charged.

27. The distribution, collection and charging machine of claim 21 wherein the at least one controller identifies as part of the second number of portable electrical energy storage devices at least one portable electrical energy storage device which is more than halfway to being fully charged.

28. The distribution, collection and charging machine of claim 27 wherein the at least one controller further identifies as part of the second number of portable electrical energy storage devices any portable electrical energy storage devices which are more than approximately 80-85 percent fully charged.

29. The distribution, collection and charging machine of claim 21 wherein the at least one controller identifies for accelerated charging at least one portable electrical energy storage device which is less fully charged than at least another portable electrical energy storage device.

30. The distribution, collection and charging machine of claim 29 wherein the charging subsystem charges at least one more fully charged portable electrical energy storage devices using energy from at least one less fully charged portable electrical energy storage device.

31. The distribution, collection and charging machine of claim 21 wherein the at least one controller further identifies as part of the second number of portable electrical energy storage devices at least one portable electrical energy storage device which is to sacrifice charge.

32. The distribution, collection and charging machine of claim 21 wherein the at least one controller identifies the first number of portable electrical energy storage devices currently removably located at a first distribution, collection and charging machine to be charged at an accelerated rate is performed in response to detection of receipt of an at least partially discharged portable electrical energy storage device at a first one of the receivers of the distribution, collection and charging machine at the first time.

33. The distribution, collection and charging machine of claim 21 wherein at least partially discharged portable electrical energy storage device removably received at the first one of the receivers of the first distribution, collection and charging machine is a battery sized to power a personal vehicle.

34. The distribution, collection and charging machine of claim 21 further comprising:

a first number sensors positioned and operable to detect a presence or absence of a portable electrical energy storage device at any of the receivers of the distribution, collection and charging machine; and a second number of sensors positioned and operable to detect a charge state of any portable electrical energy storage device received in a respective one of the receivers of the distribution, collection and charging machine.

35. The distribution, collection and charging machine of claim 21 wherein the at least one controller repeatedly updates the portable electrical energy storage devices identified for charging at an accelerated rate.

36. The distribution, collection and charging machine of claim 35 wherein the at least one controller repeatedly updates the portable electrical energy storage devices identified for charging at an accelerated rate based at least in part on a current charge condition of the portable electrical energy storage devices currently removably located in respective receivers of the distribution, collection and charging machine.

37. The distribution, collection and charging machine of claim 35 wherein the at least one controller repeatedly updates the portable electrical energy storage devices identified for charging at an accelerated rate based at least in part on a presence or absence of the portable electrical energy storage devices in the receivers of the distribution, collection and charging machine.

38. The distribution, collection and charging machine of claim 35 wherein the at least one controller repeatedly updates the portable electrical energy storage devices identified for charging at an accelerated rate based at least in part on a total number of portable electrical energy storage devices currently removably received by respective receivers of the distribution, collection and charging machine and a respective charge state of each of the portable electrical energy storage devices currently removably received by respective receivers of the distribution, collection and charging machine.

39. The distribution, collection and charging machine of claim 35 wherein the at least one controller repeatedly updates the portable electrical energy storage devices identified for charging at an accelerated rate based at least in part on a total cumulative charge available from a number of portable electrical energy storage devices identified as available to sacrifice charge for charging the portable electrical energy storage devices to be charged at the accelerated rate.

40. The distribution, collection and charging machine of claim 21 wherein the charging subsystem is electrically coupled to receive electrical power from the electrical service via mains of an electrical service panel supplied via a metered electrical service from an external electrical grid, and wherein the charging subsystem includes a power converter operable to convert at least one of a voltage, a phase or a current of electrical power received from the metered electrical service to a form suitable for charging a portable battery sized for use in a two wheeled personal transportation vehicle.

41. The distribution, collection and charging machine of claim 21 and further comprising:

a number of electrical contacts positioned in respective ones of the receivers to electrically couple with any of the portable electrical energy storage devices removably received by the receiver;

a first plurality of switches operable in response to the controller to selectively electrically couple respective ones of the electrical contacts to the power converter; and a second plurality of switches operable in response to the controller to selectively electrically couple respective ones of the electrical contacts to other ones of the electrical contacts.

42. A nontransitory computer-readable medium that stores instructions executable by a processor to operate a distribution, collection and charging machine for distribution, collection and charging of portable electrical energy storage devices, by:
    identifying by the processor a first number of portable electrical energy storage devices currently removably located at a first distribution, collection and charging machine to be charged at an accelerated rate relative to at least a second number of portable electrical energy storage devices currently removably located at the first distribution, collection and charging machine, wherein identifying by the processor includes identifying for accelerated charging at least one portable electrical energy storage device which is over halfway to being fully charged;
    causing a charging subsystem to charge the first number of portable electrical energy storage devices via an electrical service, where the electrical service has an associated limiting rating; and
    causing the charging system to charge the charging subsystem the first number of portable electrical energy storage devices via energy supplied from at least the second number of portable electrical energy storage devices concurrently with the charging of the first number of portable electrical energy storage devices via the electrical service.

43. The nontransitory computer-readable medium of claim 42 wherein the instructions further cause the controller to identify the second number of portable electrical energy storage devices as including any portable electrical energy storage device which is below a first threshold of being fully charged and which is also above a second threshold of being fully depleted.

44. The nontransitory computer-readable medium of claim 42 wherein the processor identifies the first number of portable electrical energy storage devices to be charged at an accelerated rate by identifying for accelerated charging at least one portable electrical energy storage device which is more fully charged than at least another portable electrical energy storage device.

45. The nontransitory computer-readable medium of claim 44 wherein the instructions cause the charging circuit to charge the at least one more fully charged portable electrical energy storage device using energy from the at least one less fully charged portable electrical energy storage device.

46. The nontransitory computer-readable medium of claim 42 wherein the controller identifies the first number of portable electrical energy storage devices to be charged at an accelerated rate by identifying for accelerated charging at least one portable electrical energy storage device which is less fully charged than at least another portable electrical energy storage device.

47. The nontransitory computer-readable medium of claim 46 wherein the instructions cause the processor to cause the charging circuit to charge at least one more fully charged portable electrical energy storage devices using energy from at least one less fully charged portable electrical energy storage device.

48. The nontransitory computer-readable medium of claim 42 wherein the instructions further cause the processor to identify as part of the second number of portable electrical energy storage devices at least one portable electrical energy storage device which is to sacrifice charge.

49. The nontransitory computer-readable medium of claim 42 further comprising:
    repeatedly detecting insertion of any portable electrical energy storage device at any of a plurality of receivers of the first distribution, collection and charging machine;
    determining a charge state of the inserted portable electrical energy storage device; and
    repeatedly updating the portable electrical energy storage devices identified for charging at an accelerated rate over time.

50. The nontransitory computer-readable medium of claim 49 wherein the repeatedly updating the portable electrical energy storage devices identified for charging at an accelerated rate is based at least in part on a current charge condition of the portable electrical energy storage devices currently removably located at the first distribution, collection and charging machine.

51. The nontransitory computer-readable medium of claim 49 wherein the repeatedly updating the portable electrical energy storage devices identified for charging at an accelerated rate is based at least in part on a presence or absence of the portable electrical energy storage devices at the first distribution, collection and charging machine.

52. The nontransitory computer-readable medium of claim 49 wherein the repeatedly updating the portable electrical energy storage devices identified for charging at an accelerated rate is based at least in part on a total number of portable electrical energy storage devices currently removably located at the first distribution, collection and charging machine and a respective charge state of each of the portable electrical energy storage devices.

53. The nontransitory computer-readable medium of claim 49 wherein the repeatedly updating the portable electrical energy storage devices identified for charging at an accelerated rate is based at least in part on a total cumulative charge available from a number of portable electrical energy storage devices identified as available to sacrifice charge for charging the portable electrical energy storage devices to be charged at the accelerated rate.

* * * * *